(12) United States Patent
Srivastava et al.

(10) Patent No.: US 11,816,100 B2
(45) Date of Patent: Nov. 14, 2023

(54) DYNAMICALLY MATERIALIZED VIEWS FOR SHEETS BASED DATA

(71) Applicant: Amazon Technologies, Inc., Seattle, WA (US)

(72) Inventors: Anupam Srivastava, Vancouver (CA); Syed Kamran Masood, Santa Clara, CA (US); Adam Bosworth, San Francisco, CA (US); Ian Eslick, San Francisco, CA (US); Mohammad Asif Ali Khan, San Jose, CA (US); Joseph Rozenfeld, San Carlos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/542,244

(22) Filed: Dec. 3, 2021

(65) Prior Publication Data
US 2022/0092059 A1    Mar. 24, 2022

Related U.S. Application Data

(63) Continuation of application No. 16/452,401, filed on Jun. 25, 2019, now Pat. No. 11,194,793.

(51) Int. Cl.
| | | |
|---|---|---|
| *G06F 17/30* | (2006.01) | |
| *G06F 16/23* | (2019.01) | |
| *G06F 16/24* | (2019.01) | |
| *G06F 16/22* | (2019.01) | |

(52) U.S. Cl.
CPC ...... *G06F 16/2393* (2019.01); *G06F 16/2282* (2019.01); *G06F 16/24* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | |
|---|---|---|
| 5,187,788 A | 2/1993 | Marmelstein |
| 5,255,356 A | 10/1993 | Michelman et al. |
| 5,371,675 A | 12/1994 | Greif et al. |
| 5,499,371 A | 3/1996 | Henninger et al. |
| 5,604,854 A | 2/1997 | Glassey |
| 6,134,543 A | 10/2000 | Witkowski |
| 6,295,541 B1 | 9/2001 | Bodnar et al. |
| 6,496,819 B1 | 12/2002 | Bello |

(Continued)

OTHER PUBLICATIONS

Google, "IMPORTRANGE—Docs editors Help," downloaded from https://support.google.com/docs/answer/3093340 on Oct. 4, 2017, pp. 1-3.

(Continued)

*Primary Examiner* — Hung D Le
(74) *Attorney, Agent, or Firm* — Robert C. Kowert; Kowert, Hood, Munyon, Rankin & Goetzel, P.C.

(57) ABSTRACT

A descriptor of a dynamically materialized view is stored. The descriptor includes a query to select a subset of cells from a data sheet, and a result of executing the query. In response to an update directed to the data sheet, the result stored in the descriptor is modified based on re-executing the query, and a notification is transmitted to an execution platform at which an application whose output depends on the dynamically materialized view runs.

20 Claims, 18 Drawing Sheets

(56) References Cited

U.S. PATENT DOCUMENTS

| | | | |
|---|---|---|---|
| 6,592,626 B1* | 7/2003 | Bauchot | G06F 40/18 715/217 |
| 6,631,497 B1 | 10/2003 | Jamshidi et al. | |
| 6,636,886 B1 | 10/2003 | Katiyar et al. | |
| 6,725,422 B1* | 4/2004 | Bauchot | G06F 40/18 715/220 |
| 6,742,175 B1 | 5/2004 | Brassard | |
| 6,877,155 B1 | 4/2005 | Lindsey | |
| 6,882,993 B1 | 4/2005 | Lawande | |
| 6,901,579 B1 | 5/2005 | Suguta | |
| 6,988,241 B1 | 1/2006 | Guttman et al. | |
| 7,032,210 B2 | 4/2006 | Alloing et al. | |
| 7,941,438 B2 | 5/2011 | Molina-Moreno et al. | |
| 10,884,765 B1 | 1/2021 | Daxini et al. | |
| 11,086,894 B1 | 8/2021 | Srivastava et al. | |
| 11,194,793 B1 | 12/2021 | Srivastava et al. | |
| 2002/0059203 A1 | 5/2002 | Witkowski et al. | |
| 2002/0095421 A1 | 7/2002 | Koskas | |
| 2002/0103825 A1* | 8/2002 | Bauchot | G06F 40/18 715/226 |
| 2003/0188256 A1* | 10/2003 | Aureglia | G06F 40/18 715/214 |
| 2003/0188257 A1* | 10/2003 | Aureglia | G06F 40/18 715/217 |
| 2003/0188258 A1* | 10/2003 | Aureglia | G06F 40/18 715/214 |
| 2003/0188259 A1* | 10/2003 | Aureglia | G06F 40/18 715/214 |
| 2004/0133567 A1 | 7/2004 | Witkowski et al. | |
| 2004/0133568 A1 | 7/2004 | Witkowski et al. | |
| 2005/0015379 A1* | 1/2005 | Aureglia | G06F 40/18 |
| 2006/0047696 A1 | 3/2006 | Larson | |
| 2006/0095407 A1 | 5/2006 | Ortega et al. | |
| 2009/0006319 A1 | 1/2009 | Lehtipalo et al. | |
| 2009/0158251 A1 | 6/2009 | Angrish et al. | |
| 2010/0269092 A1* | 10/2010 | Dorman | G06Q 40/02 715/219 |
| 2011/0137875 A1 | 6/2011 | Ziauddin | |
| 2011/0295904 A1 | 12/2011 | Mohan et al. | |
| 2012/0084708 A1 | 4/2012 | Upadhyaya | |
| 2013/0132812 A1* | 5/2013 | Goel | G06F 40/18 715/249 |
| 2013/0332396 A1 | 12/2013 | Welcker | |
| 2014/0095520 A1 | 4/2014 | Ziauddin | |
| 2015/0088885 A1 | 3/2015 | Hopeman, IV | |
| 2015/0100594 A1 | 4/2015 | Hess | |
| 2016/0070733 A1 | 3/2016 | Gould et al. | |
| 2018/0157467 A1 | 6/2018 | Stachura | |
| 2018/0157468 A1 | 6/2018 | Stachura | |
| 2018/0232351 A1* | 8/2018 | Singh | G06F 16/337 |
| 2019/0095486 A1 | 3/2019 | Hopeman, IV et al. | |
| 2019/0220464 A1 | 7/2019 | Butani | |
| 2019/0220509 A1* | 7/2019 | Elias | G06F 40/174 |
| 2020/0142987 A1 | 5/2020 | Grabs | |
| 2020/0159722 A1 | 5/2020 | Johansen | |
| 2021/0365446 A1 | 11/2021 | Srivastava et al. | |

OTHER PUBLICATIONS

Microsoft, "Overview of Excel tables," downloaded from https://support.office com/en-us/article/Overview-of-Excel-tables-7ab0bb7d-3a9e-4b56-a3c9-6c94334e492c on Oct. 2, 2017, pp. 1-6.

Microsoft, "Work with hypedinks in Excel," downloaded from https://support.office.com/en-us/article/Work-with-hyperlinks-in-Excel-7fc80d8d-68f9-482f-ab01-584c44d72b3e on Oct. 3, 2017, pp. 1-9.

Lili Mou, et al., "On End-to-End Program Generation from User Intention by Deep Neural Networks," ACM, Oct. 25, 2015, pp. 1-4.

Tao Lei, et al., "From Natural Language Specifications to Program Input Parsers," 2013, In Association for Computational Linguistics (ACL), pp. 1-10.

Joel Galenson, et al., "CodeHint: Dynamic and Interactive Synthesis of Code Snippets," ICSE'14, May 31-Jun. 7, 2014, ACM 978-1-4503-2756—May 14, 2005, pp. 653-663.

Amazon web Services, "Amazon Machine Learning, Developer Guide, Version Latest," Copyright © 2017 Amazon Web Services, Inc., pp. 1-153, downloaded Feb. 2, 2017.

"17 Top App Makers to Create Your Own Mobile App—Without a Single Line of Code!," May 16, 2017, downloaded from https://www.websitetooltester.com/en/blog/app-makers/, pp. 1-48.

Mehdi Manshadi, et al., "Integrating Programming by Example and Natural Language Programming," Copyright 2013, Association for the Advancement of Artificial Intelligence (www.aaai.org), pp. 1-7.

U.S. Appl. No. 15/987,841, filed May 23, 2018 Joseph Rozenfeld.
U.S. Appl. No. 15/818,677, filed Nov. 20, 2017, Adam Bosworth.
U.S. Appl. No. 15/839,663, filed Dec. 12, 2017, Adam Bosworth.
U.S. Appl. No. 16/367,092, filed Mar. 27, 2019, Joseph Rozenfeld.

* cited by examiner

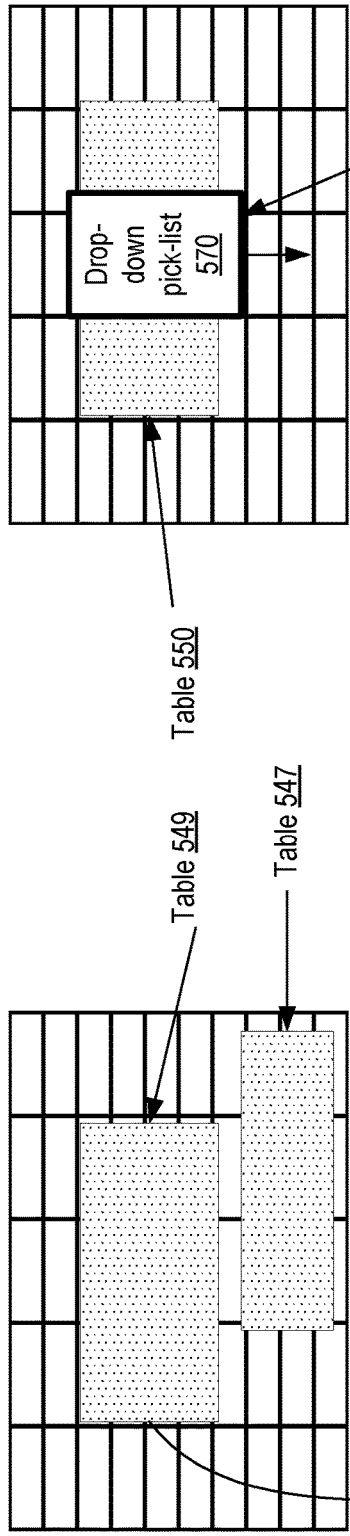
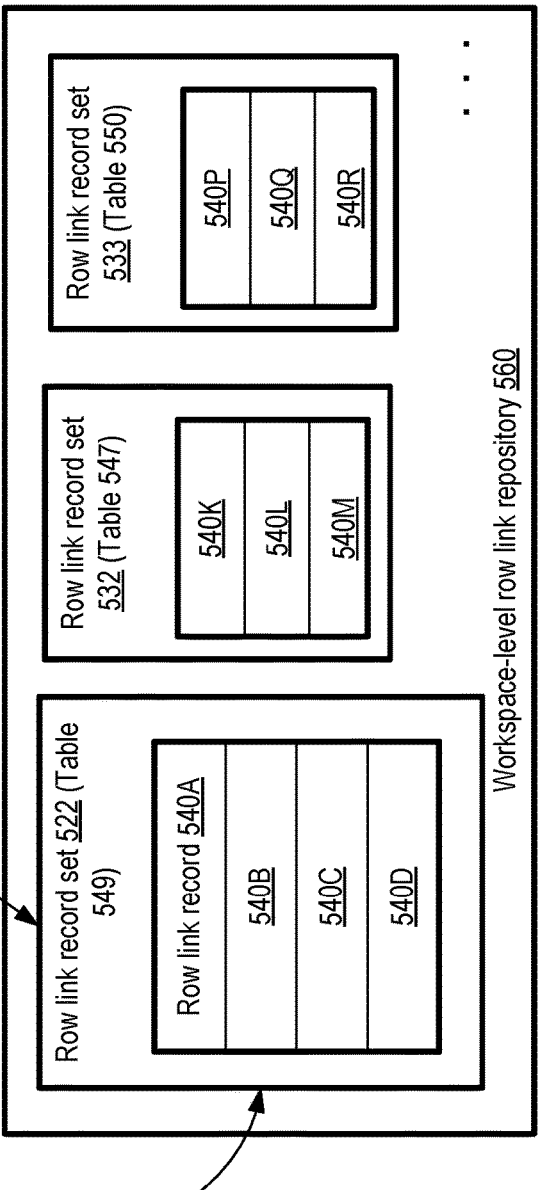
FIG. 5

FIG. 8

State 801

Cell section 612

Table-A

| Task | Team | Due Date |
|---|---|---|
| Write spec | Prod Mgmt ∨ | Jan 15 |
| Code | SWDev ∨ | Mar 15 |
| Test set 1 | QA ∨ | Mar 30 |
| Test set 2 | QA ∨ | Apr 15 |
| Deploy | Production ∨ | Apr 30 |

Table-B (with new column Tasks)

| Teams | Tasks | Tasks-by-Apr1 |
|---|---|---|
| Prod Mgmt | ▽ 1 | ▽ 1 |
| SWDev | ▽ 1 | ▽ 1 |
| QA | ▽ 2 | ▽ 1 |
| Production | ▽ 1 | ▽ 0 |

Filters/DMVs can be pipelined (e.g., using syntax similar to "=Filter([Tasks], "Table-A[Due Date] <= Date(2019,04,01)")")

State 802

Cell section 612

Table-A

| Task | Team | Due Date |
|---|---|---|
| Write spec | Prod Mgmt ∨ | Jan 15 |
| Code | SWDev ∨ | Mar 15 |
| Test set 1 | QA ∨ | Mar 30 |
| Test set 2 | QA ∨ | Apr 15 |
| Deploy | Ship ∨ | Apr 30 |

Table-B

| Teams | Tasks | Tasks-by-Apr1 |
|---|---|---|
| Prod Mgmt | ▽ 1 | ▽ 1 |
| SWDev | ▽ 1 | ▽ 1 |
| QA | ▽ 2 | ▽ 1 |
| Ship | ▽ 1 | ▽ 0 |

Change in Table-B (e.g., name change from "Production" to "Ship") is instantaneously propagated to Table-A

DYNAMICALLY MATERIALIZED VIEWS FOR SHEETS BASED DATA

This application is a continuation of U.S. patent application Ser. No. 16/452,401, filed Jun. 25, 2019, which is hereby incorporated by reference herein in its entirety.

BACKGROUND

As collecting and storing data from a variety of sources has become easier and cheaper in recent years, business decisions are increasingly being made in a data driven manner. Over recent decades fairly sophisticated data processing applications have been developed using databases of various types, including traditional relational databases, object-oriented databases, non-relational or "NoSQL" databases, and the like. In some cases, such data processing applications have been designed to handle millions of even billions of data records.

Typically, developing and changing applications that rely on database systems is a non-trivial exercise, usually involving teams of programmers and long development cycles. Large well-financed organizations may be able to hire enough programming staff to develop and maintain the applications for various target environments, or outsource the work of developing and maintaining the applications. However, for a "long tail" of relatively small teams or individuals, the costs associated with developing full-fledged data management applications using conventional database systems may sometimes be prohibitive. Furthermore, interacting with the database applications may sometimes require expertise in languages (such as various versions of the Structured Query Language in the case of relational databases) in which expertise may sometimes be lacking in small teams.

In contrast to large and complex database systems, spreadsheet applications offer an easier-to-use approach towards managing data. Spreadsheets offer a tabular view of data, often with fewer restrictions (for example on the types of data that can be stored in a given row or column) than database systems, and allow many common types of calculations to be performed on data sets using formulas that are relatively easy to understand and modify. However, as the size of the data sets to be managed increases, especially in scenarios in which hierarchical and relational associations between different sets of data need to be incorporated into the applications, some traditional spreadsheet programs may not necessarily work well.

BRIEF DESCRIPTION OF DRAWINGS

FIG. 5 illustrates an example use of an automatically generated pick list to indicate relationships between rows of a pair of logical tables, according to at least some embodiments.

FIG. 6, FIG. 7 and FIG. 8 collectively illustrate a simple example use of filter functions to indicate relationships among rows of a pair of logical tables, according to at least some embodiments.

Figure 1:
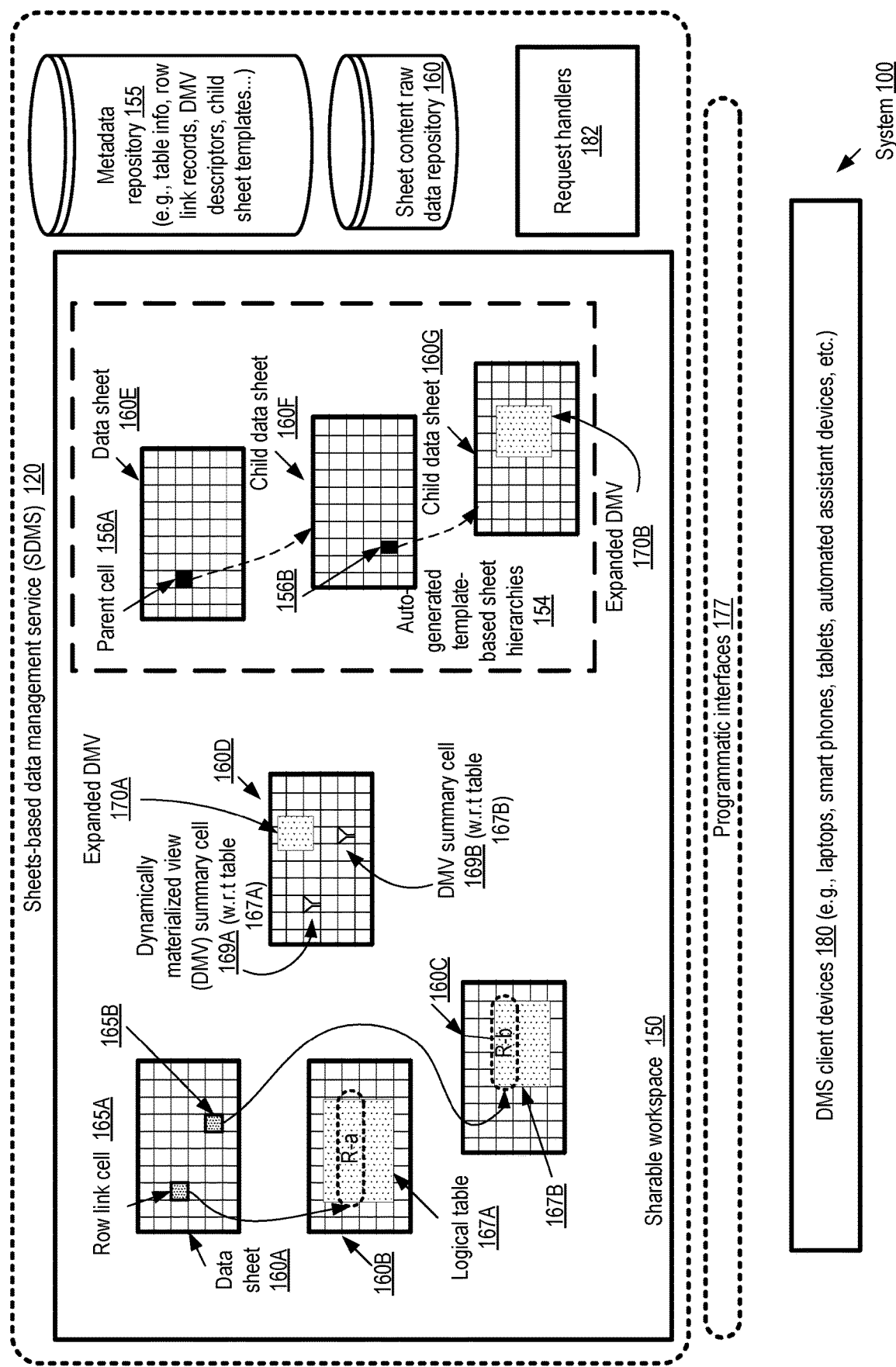
FIG. 1 illustrates an example system environment in which a sheets based data management service with support for dynamically materialized views and row links may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing and utilizing dynamically materialized views and row links for data sheet based applications are described. Such applications may, for example, be designed for deployment to mobile environments (such as smart phones), web browser-based execution environments, as well as environments in which interfaces supporting end-user interactions via audio interfaces, gestures, and the like may be used. In some embodiments, the applications may use an underlying network-accessible data management service that supports a "web-of-sheets" model for application data. In the web-of-sheets model, data may be stored in logically linkable two-dimensional cell grids or "data sheets", with automatic instantiation of child data sheets to represent hierarchical relationships, as well as the ability to represent several types of logical associations or relationships between cells, resulting in automated real-time or near-real time updates within the data sheets as well as within applications relying on the data sheets.

In some embodiments, at least two types of primitives may be supported at a sheets-based data management service (SDMS) for indicating logical relationships and dynamically updating data elements based on such relationships: row links and dynamically materialized views (DMVs) associated with specified queries. One or more data sheets may be created at the SDMS and used to store a data set of an application, e.g., within a project workspace associated with the application; the project workspace may for example be shared among various SDMS users such as application authors collaborating on the design and development of the application. With respect to a given data sheet, an SDMS client may use a programmatic interface (e.g., a "create table" command selected from a menu of a graphical user interface) to indicate that a plurality of cells of the data sheet are to be designated as a logical table—that is, that the plurality of cells, arranged in some number of rows and some number of columns, contain related data and are to be treated as a unit with respect to various types of operations. In response to a designation of the plurality of cells as a logical table, in at least some embodiments, the SDMS may automatically generate and store, corresponding to individual rows of the table, a respective row link record comprising an immutable row identifier. The row for which a given row link record is created may be referred to as the source row of the row link in some embodiments, and the logical table containing the source row may be referred to as the source table of the row link. Individual ones of the immutable row identifiers may be generated in some embodiments such that they are unique, at least within the workspace in which the data sheet was created. In some embodiments, UUIDs (universal unique identifiers), such as randomly-assigned 128-bit numeric values, 256-bit numeric values and/or strings (or concatenations of such numerals and strings) may be used as the immutable identifiers. Note that the identifier for a given row may not be dependent on the values stored in the cells of the corresponding source row in some embodiments—for example, an identifier may be implemented as a numeric or alphanumeric value which differs from, and is not necessarily derived from, any of the values stored in the columns of the row. If two rows of a source table have exactly the same values in each of their columns (i.e., if, for all applicable columns Ci in two rows R1 and R2, the value stored in column Ci of row R1 is identical to the value stored in column Ci of row R2), the identifiers generated for the two rows may nevertheless be different in such embodiments. In at least some embodiments, a logical table may, at least at some point in time, comprise one or more empty rows (that is, rows whose cells do not contain any data), and respective row link record may be generated and used for the empty rows as well as any non-empty rows. Row link record identifiers may be referred to as being immutable because, even if the structure of the source table changes (e.g., as a result of the addition of a row or a column), resulting in changes to the cell coordinates (row number and/or column number) of source row cells within the data sheet, in at least some embodiments the same identifier may continue to represent and refer to a given source row as before the structural change.

In some embodiments, a row link record may comprise a display specification and/or a user-defined name for the source row. The display specification may indicate how the row link is to be visually presented—e.g., if a cell C1 of a sheet is populated with a row identifier of a given source row, contents of which columns (if any) of the source row should be displayed in C1, and how the values of the source row columns should be formatted in C1. For example, consider a scenario in which the source table has columns named "EmployeeName," "EmployeeID, "DepartmentID," and "Rank". One display specification in such a scenario may indicate that the displayed value for the referencing cell (the cell which is populated with or associated with the row identifier) should concatenate the EmployeeName and Rank entries of the source row, with a dash ("-") separating the EmployeeName and Rank.

Row link records, and contents derived from the source rows of the row link records, may also be accessed via formulas in some embodiments, e.g., from other data sheet cells or from applications. A formula may comprise, for example, the name and parameters of a function (such as a "FindRow( )" function) that when evaluated returns the row identifier, which may in turn serve as a pointer to the source row. The use of a FindRow( ) function in the formula of a referencing cell C1 may thus result in the SDMS storing an indication that C1 is associated with the row identifier returned from the evaluation of the FindRow( ) function. A FindRow( ) function may indicate a query parameter in some embodiments, indicating one or more predicates or clauses expressed in terms of the column identifiers of the source table—e.g., a call to FindRow(Table1, "Table.Column1==1") may return the row identifier of the first row within a table named Table1 whose Column1 value is equal to 1. In some embodiments, if multiple rows of the source table match the query predicate(s), the row identifier of the first matching row (when the table is traversed top to bottom) may be returned. Alternatively, in other embodiments, the client of the SDMS may indicate how a single row from multiple matching rows is to be selected in response to a FindRow( ) invocation. Note that although example syntax has been provided herein to illustrate various aspects of row links and dynamically materialized views, the underlying concepts and techniques are not tied to any particular syntax; as such, the syntax of commands or programmatic interactions used to create, access, modify and/or delete row links and dynamically materialized views may differ in various embodiments.

Row links may also be used to extract and/or display one or more columns of a row in at least some embodiments, and thus need not be limited to representing an entire row. For example, to extract the Column2 value from a row link defined using Column1, syntax similar to FindRow(Table1, "Table.Column1==1")[Column2] may be used. In various embodiments, row links may be used as the basis for expressions across related rows within multiple logical tables, and expressions evaluations may utilize and/or return row links where appropriate. For example, an expression similar to "[Total Cost]=[Product][Price]*[Customer][Discount]*[Quantity]" may be evaluated using row links representing the respective rows of Product and Customer tables. In another example, the taxes due from an entity may be computed with the help of row links using a combination of row-link based expressions similar to the following: (a) [TaxRule]=FindRow(TaxRules,"TaxRules[Minimum Income]>=[Gross Income] ORDER by TaxRules[Minimum Income]) and (b) [TaxesDue]=([Gross Income]—[TaxRule] [Minimum Income])*[TaxRule][Marginal Rate])+TaxRule [Minimum Due].

A row identifier may be used in effect as a pointer to refer to the contents of the corresponding source row from various cell locations or application code components in different embodiments. For example, the row identifier of one of the rows of a logical table T1 may be stored in a record generated at the SDMS to indicate that a cell C1 of a different table T2 is related to, and/or should display values of one or more columns of, the source row. In another example a formula associated with a row link record, which evaluates to the identifier of the row, may be programmatically bound to an element of a graphical layout of a data sheets based application, such that at run time the formula is dynamically re-evaluated to determine the data (stored in the corresponding row) to be displayed in the layout element. In various embodiments, row identifiers and/or row link records may be accessed and used via any of several types of programmatic interfaces, including components of the graphical interfaces to data sheets provided by the SDMS (similar to spreadsheet interfaces), one or more types of function calls that may be issued to evaluate expressions from within sheets-based applications or from individual cells within the data sheets, and/or one or more application programming interfaces (APIs). In at least one embodiment, the SDMS may also provide a self-reference function for a row link record, which can be used within a formula entered for a given cell to refer to the row to which that cell belongs.

In at least some embodiments, as and when the contents of the source row of a row link record change, the cells or application elements which refer to the source row (e.g., via the row identifier stored in the associated row link record) may be dynamically updated as well. The terms "target data element" or "referencing data element" of a row link record or row identifier may be used to refer collectively to (a) application elements that refer to the row link record using the row identifier and (b) data sheet cells that refer to the row link records via the row link identifier. Such dynamic modification of the target data elements may continue to represent values obtained from the correct updated source row, regardless of whether structural changes to the source table have occurred since the row link record was created, which may have resulted in changes to cell coordinates of the cells of the source row in various embodiments. As a result, applications that rely on the source table may continue to work correctly despite structural changes to the data sheet containing the source table. Row link records may thus help enhance the robustness of data sheets based applications substantially. In scenarios in which other cells (outside the source table) refer to rows of the source tables via row links/identifiers, the displayed contents of such other cells may also be dynamically modified when the source row content changes in such embodiments, regardless of changes to the structure of the source table. In at least one embodiment, a data sheet user may optionally select a deferral setting with respect to a row link record associated with a given source row: e.g., instead of immediately updating referencing cells or application components which refer to the source row via its row link or row identifier, a notification may be sent to the referencing cells or application components, indicating that the data being referenced may be out-of-date or stale. In response to such a notification, the application component or referencing cell may, for example, issue a refresh request to obtain the current value(s) from the source row and display the current value(s) according to a desired format. Row links may also be considered as the equivalents of edges in a graph of relationships; as such, the functionality described herein may blend aspects of relational modeling with graph operations. For example, in an expression similar to "Table[Table1[Col1]][Table2[Col3]] [Table3[Col2]]", each intermediary column value represents a row link to the next table, representing an edge of a relationship graph. Furthermore, row links provide an important differentiation from databases by supporting very complex queries without requiring users to have to understand an underlying data model. In traditional databases, views typically need to be created by someone proficient in relational modeling, and then maintained. In contrast, row links eliminate the need to understand relational modeling to set them up; instead, they may be created and used in various embodiments via WYSIWYG (what you see is what you get) interfaces. Furthermore, queries may be executed directly on data sets that include row links in various embodiments, without requiring database-like views to be explicitly created and maintained.

In addition to row link records of the kind described above, an SDMS may support dynamically materialized views (DMVs) associated with respective queries directed to a logical table in some embodiments. At least a portion of a data set of an application, stored in one or more data sheets at the SDMS in such embodiments, may comprise one or more logical tables of the kind discussed above. The SDMS may, for example in response to a programmatic request from a client, generate and store a descriptor of a DMV associated with a particular logical table (referred to as the source table of the DMV). The descriptor may in some embodiments comprise (a) a filter query to be used to select a subset of cells from the logical table and (b) a result of executing the filter query. A filter query may indicate one or more Boolean predicates or clauses on the columns of the logical table in various embodiments. A given DMV may represent a set of rows, and in at least some embodiments, any operations that can be performed on a set of rows of a table may also be performed on a DMV. Any desired set of sets in a given column of a table for that set of rows may be referenced using filters in such embodiments. For example, using syntax similar to [Undone Tasks]=Filter(Tasks,"Tasks [Done]=FALSE"), a subset of tasks that have not yet been completed may be obtained from a Tasks table. If each task has an associated number of "points" associated with it, the average number of points of undone tasks may be obtained using syntax similar to [Average Undone Points]=Average ([Undone Tasks][Points]). This in turn means that a filter query may operate on a summary value. Continuing the example, syntax similar to [Expensive Undone Tasks]=Filter ([Undone Tasks],"Tasks[Points]>=[Average Undone Points]"), a DMV may be populated with all those undone tasks whose points are above average for the undone tasks. In one embodiment, DMVs or their queries may be chained or pipelined—e.g., one DMV, DMV1 may be defined in terms of another DMV, DMV2. That is, in such embodiments, the output of one DMV (rather than a source table) may serve as the input for another DMV; as such, tables and DMVS may both be considered examples of input data sets on which the filter query of a new DMV may be applied to obtain the results of the new DMV. An SDMS client may indicate a filter query in a programmatic request to create the DMV in various embodiments. The result of executing the filter query may, for example be represented in the descriptor using a set of row identifiers of the kind introduced above, indicate one or more rows of the logical table that satisfy the filter query. Such row identifiers may have been generated automatically at the time of creation of the logical table in response to a programmatic request in at least some embodiments as discussed above. A DMV may be referred to as a filter in some embodiments.

After a descriptor for a DMV has been created and stored, the DMV may be used to populate one or more target data elements, e.g., within the sheets-based application or within one or more data sheets of the SDMS. For example, in one embodiment, a summarized representation of the DMV may be displayed within another cell (or set of cells) of the same data sheet that contains the source table. The summarized representation, whose format and contents may be selectable/specifiable by an SDMS client in some embodiments, may for example include a graphical filter symbol (e.g., a "funnel" symbol, illustrated in several of the accompanying figures and discussed below), and a dynamically updated property of a result of executing the filter query. In some embodiments, the dynamically updated property may for example indicate the cardinality (number of rows) of the query result. As and when the source table changes in such a way that the result of the filter query would be changed, the displayed property may also be updated in various embodiments. For example, consider a scenario in which, at the time that an SDMS client requests the creation of a DMV, the number of rows returned when the specified filter query is executed is five, and the result row count (the numeral 5) is displayed in the summary representation. If the contents of the source table are changed, such that the result row count becomes four, the numeral 5 would automatically and near-instantaneously be replaced in the display of the summary representation by the numeral 4 in this example scenario.

In addition to, or instead of, a summary representation, an expanded or full representation of the query result may also be displayed in various embodiments, e.g., within one or more data sheets of the SDMS or within a portion of the application. The expanded representation may display values of one or more columns of the logical table for all of the rows in the filter query result in some embodiments; in other embodiments, only the first N rows (where N may be selectable by the SDMS client) may be displayed by default.

If and when a row of the source data set (e.g., a table or another DMV) of a given DMV is updated, a combination of corresponding actions may automatically be implemented at the SDMS in some embodiments. The filter query of the given DMV may be re-executed in such embodiments, and a new result (if the result has changed) may be stored in the DMV's descriptor. In at least some embodiments, as indicated above, the dynamically updated property displayed in the summarized representation may be modified. In various embodiments, the display of the expanded representation may also be modified based on the new results of the query. Note that the changes applied to the expanded representation may include re-sorting the presented data in some embodiments, e.g., if the changes to the source table resulted in changes to the values of a sort column. That is, in such a scenario, not only may values displayed in one or more rows of the expanded representation be changed, but rows in the expanded representation may also be rearranged relative to one another based on dynamically re-sorting the rows. In some embodiments, a notification may be transmitted from the SDMS to an application deployment platform at which an application that references the DMV is running, indicating that a new result of executing the query has been obtained. Consequently, at the application deployment platform, output presented by the application may be modified based at least in part on the new result. In some cases the output of the application may be updated immediately and automatically in response to the notification. Note that in various embodiments in which sheets-based applications that utilize the row-link and DMV features are developed and deployed, values affected by changes to underlying sheet cells may be recomputed instantaneously or near instantaneously (in contrast to traditional databases). As such, the row-link and DMV functionality may combine various benefits and advantages of spreadsheet-like interfaces with those of traditional database systems.

In some embodiments, a deferred evaluation setting for DMVs, similar to that discussed above in the context of the row link records, may be supported at the SDMS. If a client on whose behalf the DMV was created enables deferred evaluation for the DMV via a configuration setting, for example, a staleness notification may be sent to the cells associated with the representations instead of automatically updating the summarized representation and/or the expanded representation, and the values displayed therein may be modified in response to a refresh request.

In at least some embodiments, one or more tokens such as a function name may be used to define a DMV as part of the formula of a data sheet cell, or as part of an expression evaluated as part of a component of a sheets-based application. For example, an SDMS client may type in a formula similar to "=Filter(Table1, "Table1[Column1]>0")" for a given cell Cj outside Table1, thereby creating a new DMV comprising those Table1 rows that have positive values in Column1. A display specification for the DMV may be programmatically indicated by the client in some embodiments, indicating how the results of the query of the DMV should be displayed in Cj. In one embodiment, the SDMS may use a default display specification if one is not indicated by the client—e.g., elements similar to those discussed above for the summarized representation of a DMV may be used for the display in cell Cj in the above example. DMVs may be assigned respective identifiers, and/or user-defined names in at least some embodiments. In some embodiments, DMVs may be used as part of the formulas of other cells, either by using DMV identifiers/names or by referencing the cells in which the DMVs are defined. For example, if the formula of cell Cj is defined using a Filter function as in the "=Filter(Table1, "Table1[Column1]>0")" example above, a formula for cell Ck could refer to Cj's DMV using Cj's cell coordinates—e.g., Ck's formula could be set to "=Cj" or "=Filter(Cj, "Table1[Column2]>100)". In the latter scenario, Ck would in effect define a second DMV, whose results are the subset of Table1 rows whose Column2 value exceeds 100 and whose Column1 value exceeds 0. Aggregation functions may be applied to DMVs in some embodiments within cell formulas or expressions, e.g., a formula similar to "=SUM(MyFilter1[Column3])" may be used to obtain the sum of Column3 values of the results of the filter with user-defined name MyFilter1 indicated within the SUM call.

In various embodiments, DMVs may be created, accessed and used via any of several types of programmatic interfaces, including components of the graphical interfaces to data sheets provided by the SDMS, one or more types of function calls that may be issued from within sheets-based applications or from individual cells within the data sheets, and/or one or more application programming interfaces (which may, for example, be used within an application's source code). In at least one embodiment, a search capability may be supported for DMVs by the SDMS—e.g., an SDMS client may be able to request that a list of DMVs that have been created and meet a specified search criterion (e.g., a user-defined name, a source data set identifier, or the like) be presented. In at least some embodiments, the SDMS may automatically create indexes on columns of logical tables to speed up operations associated with DMVs and/or row-links. In one embodiment, indexes may also be created on the strings that are displayed in a column which is populated using row links. Note that within a logical table (or any other column of a data sheet), the data types of the contents may not be required to be homogeneous—e.g., some entries in a column may comprise row links, others may comprise plain character text, others may comprise numerals, and so on. In at least some embodiments, the SDMS may internally convert data types of cell contents (e.g., for comparison or sorting, or for other operations) when needed.

As one skilled in the art will appreciate in light of this disclosure, certain embodiments may be capable of achieving various technical advantages in practical applications, including some or all of the following: (a) increasing the robustness of applications whose data sets are stored in data sheets, e.g., by eliminating errors that may otherwise result when the structure of the underlying data sheets changes, (b) enhancing the user experience of end users of data sheets based applications, by instantaneously or near-instantaneously materializing changes resulting from modifications of the underlying data sheets, and (c) enhancing the user experience of a wide range of application authors that are able to design and develop applications using easy-to-learn spreadsheet-like interfaces without having to become experts in, for example, traditional database management systems.

Example System Environment

FIG. 1 illustrates an example system environment in which a sheets based data management service with support for dynamically materialized views and row links may be implemented, according to at least some embodiments. As shown, system 100 includes various resources and artifacts of a sheets data management service (SDMS) 120 which may be used to support a variety of data sheets within sharable workspaces 150. A data sheet may comprise a grid of cells arranged in rows and columns; data sheets may also be referred to as worksheets in some embodiments. In one embodiment, collections of one or more data sheets may be referred to as workbooks, with individual workbooks being stored as respective files, and individual data sheets being accessed from within a workbook, for example, via tabs or similar interfaces. To simplify the presentation, workbooks are not discussed further in much of the subsequent description, and are not shown in the figures; instead, the discussion is framed largely in the context of data sheets.

One or more sharable workspaces 150 may be established on behalf of a given SDMS client in the depicted embodiment, e.g., in response to requests submitted from a client device 180 (such as a laptop, a smart phone, tablet or the like) via programmatic interfaces 177. A variety of programmatic interfaces 177 may be implemented in some embodiments by the SDMS 120 for the requests and corresponding responses, such as a set of APIs (application programming interfaces), web-based consoles, command-line tools, and/or graphical user interfaces (including spreadsheet-like interfaces) etc. The requests may be received and handled by one or more request handlers 182 implemented at one or more computing devices in the depicted embodiment. The client on whose behalf a workspace is created (or other entities to whom the client delegates responsibilities) may be responsible for setting up permissions associated with sharing the workspace—e.g., read, write, modify, delete, and other permissions with respect to the workspace 150 or individual sheets/workbooks (or subcomponents of the sheets) may be granted to other clients as desired. In at least some embodiments, templates used to create child sheets may include some types of security-related properties as well.

A plurality of data sheets 160 (e.g., 160A, 160B, 160C, 160D, 160E, 160F or 160G) may be created and managed within a workspace 150 at the SDMS 120, e.g., to store respective portions of data sets of a variety of applications being developed by a group of collaborating application authors in the depicted embodiment. Some such data sheets-based applications may be intended for deployment to mobile platforms such as phones or tablets; other applications may be implemented within the sheets themselves. In various embodiments, application inputs and/or outputs may be obtained from or presented to users via audio interfaces (e.g., interfaces of automated personal assistant devices), gesture recognition interfaces, augmented reality/virtual reality interfaces, web browser based interfaces of laptops/desktops and the like. Some data sheets (such as child data sheets 160F and 160G) may be created automatically as part of template-based sheet hierarchies 154, while others may be created in response to programmatic per-sheet creation requests.

A given workspace 150 may comprise one or more sheets within which logical tables are defined in the depicted embodiment, such as logical table 167A of data sheet 160B and logical table 167B of data sheet 160C. A subset of cells, comprising some number of specified rows and columns, of a given data sheet 160 may be designated as a logical table via a programmatic interface in various embodiments by an SDMS client, indicating that the cells of the rows are logically related and are to be treated as a unit for at least some types of operations. For example, a client may use a "Create Table" element of a menu of a graphical interface to a data sheet to indicate that a logical table is to be created, and then use a mouse or similar interface to indicate the collection of cells that are to be included (at least initially) in the table. In at least some embodiments, when a logical table 167 is created, metadata comprising an identifier of the table (e.g., a universal unique identifier or UUID) may be added to a repository 155 together with information indicating the member cells of the logical table. In addition, in various embodiments, respective row link records corresponding to each of the table's rows (e.g., row R-a of table 167A and row R-b of table 167B) may be generated and stored as part of the metadata repository 155 at the time of table creation. Individual ones of the row link records may comprise respective immutable identifiers of the corresponding rows, which can in effect be used as pointers to the rows from data sheet cells and/or sheets-based applications. In some embodiments, the identifiers generated may be unique within the workspace 150, while in other embodiments UUIDs may be generated. The row for which a given row link record is created may be referred to as the source row of the row link record, and the table to which the source row belongs may be referred to as the source table of the row link record in various embodiments. In some embodiments, the immutable identifier of a row link record may simply be referred to as a row link for the corresponding source row.

The automatically-generated row link record identifiers may be specified in the formulas of various data sheet cells to refer to the contents of respective source rows in various embodiments. For example, in sheet 160A, cell 165A may include the row identifier for row R-a of table 167A of sheet 160B, while cell 165B may include the row identifier for row R-b of table 167B of sheet 160C. Individual cells such as 165A and 165B which contain row identifiers may be referred to as row link cells in some embodiments. In at least one implementation, when an SDMS client clicks on a value or token stored in a row link cell 165 via a mouse (or otherwise indicates that the value or token has been selected), the cursor may be moved automatically to the corresponding source row, in a manner similar to the way that HyperText Transfer Protocol (HTTP) links can be used to navigate to referenced content in the world wide web. In various embodiments, the referencing cells such as 165A or 165B may themselves be part of a logical table 167; such a table may be referred to as a referencing table or a target table with respect to the source table of the referencing cell. In such a scenario, a record comprising the row identifier, indicating that a given cell 165 of the referencing table is related to the source row of the source table, may be stored at the SDMS. As such, row link records may be used to express relationships between rows of different logical tables, without requiring a user to write any programming code in at least some embodiments.

Row identifiers may be termed immutable in various embodiments because the identifiers themselves may not be modified if/when the structure of the source table is modified, and hence may continue to refer to the same data or cell contents to which they initially referred. For example, if/when a row or column is added to table 167A in the embodiment depicted in FIG. 1, the row link cell 165A would still continue to point to or refer to the cells that contain the contents that were in Row-a before the change to the table. If, after a structural change of this type is made to the source table, the contents of the cells that were part of Row-a is changed, the content displayed in the row link cell 165A may be automatically updated to reflect the Row-a changes in the depicted embodiment. As long as the contents of the originally-referenced source row do not change, the content displayed in the row link cell may remain unchanged in various embodiments, despite any structural change to the source table. In some embodiments, if a row identifier is being used to refer to a given source row, deletion of the source row may not be permitted by the SDMS, or a warning or error message may be displayed when such a deletion is attempted.

The content to be displayed in a row link cell 165 (and/or the format of the content) may be selected/indicated by an SDMS client in some embodiments. In at least one embodiment, a client may programmatically submit a display specification for an individual row link record, or for all the row link records referencing source rows of a given source table. The value(s) displayed in the row link cell (selected for example from among the values of one or more columns of the source row, with the selected column names being indicated in the display specification) may be formatted (e.g., as integers of a specified width, decimal numerals with specified numbers of numerals after the decimal point, currency values, dates, strings, etc.) according to the display specification. A display specification may be stored as part of the row link record in some embodiments. A default display specification may be used by the SDMS if a client does not indicate one—e.g., the value in the first (left-most) column of the source row may be displayed in the row link cell. In at least one embodiment, a token or symbol may be inserted into the row link cell to indicate that it refers to a table row—e.g., the displayed value may appear underlined, or a special "link" symbol such as an arrow may be displayed.

In at least some embodiments, the SDMS may enable clients to use one or more functions to obtain or retrieve row identifiers. For example, a FindRow( ) function may be supported in some embodiments, to which a query identifying a source logical table and one or more predicates/clauses to be evaluated with respect to the rows of the source table may be provided as inputs. When such a FindRow( ) function is executed (e.g., to evaluate a formula of a row link cell, where the formula includes the call to FindRow( ), the identifier of a row link record of a source row that satisfies the query (if any such query-satisfying rows are present in the source table) may be returned. In some embodiments, a self-reference function (e.g., "ThisRow( )") may be supported, which returns the row identifier of the row in whose cell the self-reference function is entered as part of a formula. FindRow( ) functions or the equivalent may also be invoked from within data sheets based applications in at least some embodiments, and may not necessarily be used only within the data sheets themselves. Various other properties of row link records and associated interfaces, as well as examples of the use of row link records, are described below in further detail.

The SDMS 120 may also enable clients to utilize dynamically materialized views (DMVs) on logical tables 167 in the depicted embodiment. For example, in response to a programmatic request indicating one or more properties of a view, the SDMS may store a metadata record or descriptor for a DMV in repository 155. The descriptor may for example comprise (a) a filter query to be used to select a subset of cells from a source logical table and (b) a current result of executing the filter query, indicating zero or more rows of the logical table that currently satisfy the filter query. In some embodiments, row identifiers of the rows that satisfy the query may be stored in the results portion of the descriptor. The query may comprise one or more Boolean predicates/clauses expressed in terms of the columns of the source logical table in various embodiments—e.g., to obtain the contents of rows of a table called Table1 whose Column1 value is zero, a filter query with a syntax similar "Filter (Table1, "Table1.Column1=0")" may be used.

The results of the query of the DMV may be displayed and/or used within sheets-based applications in any of several ways in different embodiments. In at least some embodiments, a summarized representation of the results may be shown in a cell whose formula indicates the DMV. Such cells may be referred to as DMV summary cells 169—e.g., summary cell 169A of sheet 160D shows a summary corresponding to a DMV defined on table 167A, while summary cell 169B shows a summary corresponding to a DMV defined on table 167B. In one embodiment, for example, a summary cell 169 may include a graphical filter symbol (e.g., a symbol representing a funnel) as well as a dynamically updated property of the query result (e.g., the number of rows of the source table that satisfy the query). In some embodiments, expanded representations of a DMV, comprising values of (or derived from) one or more columns of the rows that satisfy the query, may be displayed in one or more data sheets. For example, expanded DMV representation 170A corresponding to a DMV defined on table 167A or 167B may be shown in a collection of cells of sheet 160D, and expanded DMV representation 170B corresponding to another DMV (or the same DMV) may be shown in a collection of cells of sheet 160G in the depicted embodiment. Respective display specifications may be stored in the descriptor of a DMV in some embodiments, indicating which symbols and/or column values should be included in a summary representation and/or an expanded representation in some embodiments. Clients may programmatically indicate or modify such display requirements in various embodiments using programmatic interfaces 177. User-defined names indicated by clients may be stored for respective DMVs in some embodiments.

If and when the content of an underlying source table of a DMV changes, the filter query of the DMV may be re-executed in some embodiments, the stored results in the descriptor may be updated if needed, and the displayed contents of any summary representations and/or expanded representations may be modified accordingly based on the results of the re-execution in various embodiments. If a sorting criterion has been specified for the expanded representation, and the change in the query results affects a sort column value, rows of the expanded representation may be dynamically rearranged with respect to one another in some embodiments. In at least one embodiment, a notification may be provided by the SDMS to an application deployment platform at which an application that references the DMV is running, indicating that a new result of executing the filter query has been obtained. At the deployment platform, output presented by the application may be modified based at least in part on the new result in some embodiments.

A DMV may be created in response to a programmatic request submitted by a client, indicating for example the source logical table, the filter query, one or more display specifications for the DMV, and/or other parameters. In some embodiments, a function for creating a DMV (e.g., a Filter( ) function or a CreateView( ) function) may be defined at the SDMS and used as part of the formulas for one or more summary cells. Alternatively, a DMV may be created from, and/or utilized from sheets-based applications in such embodiments. Aggregation functions (such as SUM, AVERAGE etc.) may be applied to DMV query results in at least some embodiments. Pipelined DMVs, in which for example one view is generated by applying a query to the results of another view, may be supported in at least one embodiment.

In one embodiment, a DMV may be defined by indicating concurrent presence and absence criteria with respect to rows within other DMVs or logical tables. For example, a programmatic request may be received at the SDMS to create a DMV (DMV1), such that parameters of the request indicate a presence criterion with respect to a first source data set (e.g., another DMV (DMV2), or a logical table (T1)) and an absence criterion with respect to a second source data set (e.g., another DMV (DMV3) or a logical table (T2)). Only those rows that are present in the first source data set, and absent from the second data set, may be included in the result representing DMV1 in such a scenario. In effect, the logical equivalent of a rule to include, within a new DMV, cells that are in the first source data set and not in the second source data set may be indicated in such a request. The particular rows or cells that meet both the presence and absence criteria may be identified by the SDMS, and included in the new dynamically materialized view. Similar techniques may be used to generate DMVs that represent the logical intersection of two source data sets in some embodiments. Consider the following example scenario in which a logical table Votes has columns [User], [Topic] and [Answer] and a second logical table Topics lists possible topics on which votes are to be obtained. Syntax similar to [Votes2]=Filter(Votes, "Votes[User]=[ThisUser]") and [Open Topics]=Filter(Topics, "Not(Topics IN [Votes2]") may be used to list those topics on which a user represented by ThisUser has not voted. In another example of filtering using the absence criterion, consider a scenario in which a table Bookings has columns named [Room], [Start Date], [Checkout Date] and [Customer], while a Rooms table has columns named [Room] and {beds}. Given a desired customer booking start date [CSD] and checkout date [CCD], the set of booked rooms may be obtained using a DMV generated using syntax similar to the following: [BookedRooms]=Filter(Bookings, "Bookings[Start Date]>=[CSD] AND Bookings[StartDate]<[CCD]) OR (Bookings[Checkout Date]>=[CSD] AND Bookings[Checkout Date]<= [CCD])"). Then, syntax similar to [Free Rooms]=Filter (Rooms,"NOT (Rooms IN [BookedRooms][Rooms]") may be used to list rooms that are still available in the desired date range.

In some embodiments, clients may be able to specify deferral settings for a DMV (or a row link record), indicating that instead of immediately updating results representing changes to the source table or source row, notifications indicating that the source row/table content has changed may be sent to cells/applications that refer to the DMVs or row link records. In such a scenario, the changed results may be propagated for display, or to cause one or more operations at an application, in response to refresh requests received after the notifications have been sent.

In some embodiments, an auto-generated template-based sheet hierarchy, such as hierarchy 154, may be created on behalf of authorized users in some embodiments. In at least one embodiment, a client may designate one or more cells of a given data sheet 160E, such as a column containing cell 156A, as parent cells. Such a designation may imply that if and when a new parent cell is added (or data is entered into a previously blank parent cell), one or more child sheets such as child data sheet 160F is to be instantiated automatically by the SDMS 120 in the depicted embodiment. A sheet such as 160E containing one or more parent cells may be referred to as a parent sheet in some embodiments; note that a data sheet may be both a parent sheet and a child sheet in at least some embodiments. Child data sheets may also be referred to as details sheets in one embodiment, as they may often include supporting details about data that is summarized in the parent sheets. The properties of the child data sheet may be specified by the SDMS client, e.g., by providing names and/or formulas for various cells of the child sheet, and/or by providing example cell contents for the child sheet which can be extrapolated/generalized by the SDMS. Properties of the child data sheet may be stored in the form of persistent metadata objects called templates in some embodiments, which may be stored in a metadata repository 155. In various embodiments, just as data sheet cells may contain row link identifiers or DMV identifiers, they may also contain sheet identifiers (e.g., when referencing to cells within child sheets or parent sheets). Hierarchies of data sheets may be used in conjunction with row links and/or DMVs, for example, in some scenarios in which the data to be referenced cannot fit into a single row and is therefore placed in a child sheet. In one such example scenario, several child sheets may each contain detailed information about a financial portfolio of an individual (e.g., one row for each of numerous equity positions), and row links or DMVs defined on the contents of the child sheets, using the child sheet identifiers in the definitions of the DMVs or row links, may be used to present summary information (e.g., for a group of individuals) in a parent sheet. In another example scenario, a DMV may be defined using a query that accesses respective cells at a specified location within several or all of the child sheets of a hierarchy, and performs computations based on the values stored in those child sheet cells.

Multi-level hierarchies of parent and child data sheets may be generated automatically based on templates in some embodiments—e.g., sheet 160F may be created as a child sheet of parent cell 156A of sheet 160E, sheet 160G may be created as a child sheet of parent cell 156B of sheet 160F, and so on. In at least some embodiments, a lazy or on-demand materialization strategy may be used for child sheets—e.g., while a new child sheet may be logically instantiated as soon as data is entered into a parent cell (or as soon as a new parent cell is created), the memory/storage to be used for data of the child sheet may not necessarily be allocated until the child sheet is accessed. Rules regarding the accessibility of data among the sheets of a hierarchy may also be stored in the metadata repository 155 in at least some embodiments—e.g., such rules may indicate which portions of a child sheet are to be accessible from a parent sheet and vice versa, which updates to a child sheet are to be propagated to parent sheets and vice versa, etc. In at least some embodiments, for example, depending on the rules set up, when a value of a cell in a child data sheet is modified, a corresponding child-dependent value may be updated in one or more parent sheets. In at least some embodiments, one or more sheets of a hierarchy 154 may include row link cells, DMV summary cells and/or expanded representations of DMVs (such as 170B). The raw data for various cells (e.g., data that is not computed and updated automatically based on values of other cells) may be stored in a separate repository 160 in the depicted embodiment. In at least some embodiments, parent cells may be distinguished from other cells within data sheets using, for example, a special symbol, font or color scheme. In one embodiment, a menu element (such as a drop-down menu option) may be employed by a client to designate that a particular cell is a parent cell. The specific values/labels that are displayed within the parent cells may be selected or specified by clients in some embodiments. In some embodiments, auto-generated hierarchies such as hierarchy 154 may not necessarily be supported at an SDMS that supports row link records and/or DMVs.

Example Creation and Materialization of Row Link Records

Figure 2:
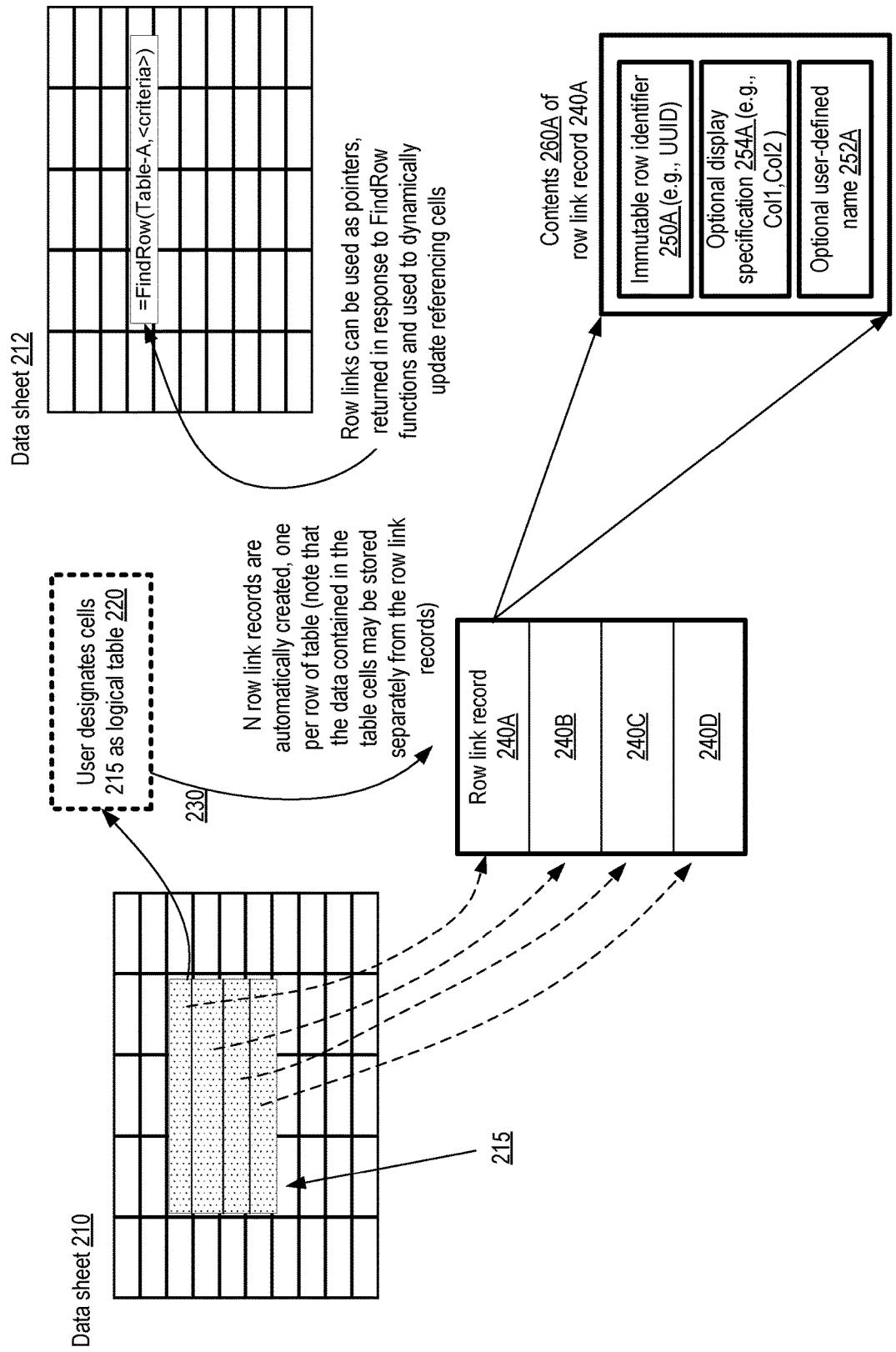
FIG. 2 illustrates example automated creation of row link records when a portion of a data sheet is designated as a logical table, according to at least some embodiments.

FIG. 2 illustrates example automated creation of row link records when a portion of a data sheet is designated as a logical table, according to at least some embodiments. A data sheet 210 may store a data set of one or more applications in the depicted embodiment at an SDMS similar to SDMS 120 of FIG. 1. A programmatic interface may be used to designate a set of cells 215 of the data sheet, arranged in one or more rows with each row comprising one or more columns, as a logical table in the depicted embodiment, e.g., by issuing a "Create Table" command via a graphical or non-graphical interface and selecting the cells 215.

In response to the designation of cells 215 as a logical table, a table record (not shown in FIG. 2) with a system-generated table identifier and/or a user-friendly name of the table may be stored in various embodiments. In addition, as indicated by arrow 230, N row link records 240 (e.g., 240A-240D in the depicted scenario in which the source table has four rows) may be automatically created and stored at the sheets-based data management system (SDMS) being used in the depicted embodiment. One row link record may be created per row of the source table. In some embodiments, as shown in contents 260A, a given row link record such as 240A may comprise a row identifier 250A, an optional display specification 254A, and/or an optional user-defined name 252A. The row identifier 250A may be generated at the SDMS, e.g., as a unique 64-bit numeric value concatenated with a random set of characters, and may be unique with respect to the workspace in which data sheet 210 was created in some embodiments. In some embodiments, portions of a timestamp or information identifying the client on whose behalf the workspace was created may also be used to generate the unique identifier. In one embodiment, universal unique identifiers (UUIDs) may be used. In one embodiment, a row link record 240 may only comprise a row identifier 250; as such, in effect the terms "row link record" and "row identifier" may be synonymous in such an embodiment.

The display specification 254A may be used to indicate how the contents of the source row are to be displayed within a referencing cell (i.e., a cell whose formula indicates the row link record or identifier) in some embodiments. For example, the display specification 254A may indicate which columns of the source row should be displayed, how the column values should be arranged relative to one another, how they should be formatted, and so on. To indicate that the value of column1 and column2 of a source row, separated by an arrow "→", should be displayed as integers, for example, in one embodiment a display specification may be expressed using syntax similar to the following: ""% d→% d",column1,column2" where the "% d"s indicate formatting as integers. In some embodiments, syntax similar to "% a" may be supported to indicate that automatic formatting is to be performed at the SDMS (e.g., based on the SDMS's algorithms for inferring data types and default formats for various data types). Default display specifications may be assigned by the SDMS for row link records for which the client does not specify them. In at least some embodiments, a string representation of a given source row may be generated based on the display specification 254 of the corresponding row link record. Such string representations for respective rows may be used, for example, to perform comparisons or sort operations with respect to other rows in at least some embodiments. For example, consider a scenario in which the display specification for a particular row link record results in the string "John,Department-A" being generated to represent the source row of the row link (the source row may include a column for an employee name, such as "John", as well as a column for a department, such as "Department-A Assume further that a string "Susan.Department-B" is generated along similar lines for another row. Then, in at least some embodiments, the strings "John.Department-A" and "Susan.Department-B" may be compared to one another to deduce that the contents of the two rows differ, and similarly, the string representations of these and other rows may be used to sort a collection of rows if desired. In some embodiments, the string representations may be displayed using "pill" user interface elements (e.g., pill-shaped icons containing a portion or all of the string).

A user-defined name 252A (such as "Ann-row" to indicate a source row associated with an individual named Ann) may be indicated by an SDMS client in some embodiments as an easy-to-interpret alias for the source row. The row identifier 250A and/or the user-defined name of a given row of a source table may in effect be used as pointers to refer to the row from other cells in various embodiments. In some embodiments, a client may obtain a row identifier of a source row with desired properties by invoking a FindRow( ) function from a cell of data sheet 212 (or from cells of data sheet 210 itself). Parameters of the FindRow function may include the source table name or identifier, as well as a query comprising predicates or clauses to be matched by a row of the source table. The evaluation of the FindRow as part of the formula of a referencing cell may return the value of the row identifier of a row that satisfies the query, and the contents displayed in the referencing cell may be selected based on the display specification of the corresponding row link record. In at least some embodiments, a self-reference function may be supported for table rows—e.g., a function such as "ThisRow( )", when entered as part of the formula of a cell Cj in row Rm of a table Tk, may return the row identifier of the row Rm. An example of the use of such a self-reference function is provided below in the context of the description of FIG. 7. Note that row links may be used to extract specific columns from the referenced rows of logical tables in various embodiments, and not just for referring to entire rows. For example, syntax similar to the following may be used to assign the value of Column-B of a row of Table-A using a row link to a cell: "=FindRow(Table-A, <criteria>)[Column-B].

Example Creation and Materialization of Dynamically Materialized Views

Figure 3:
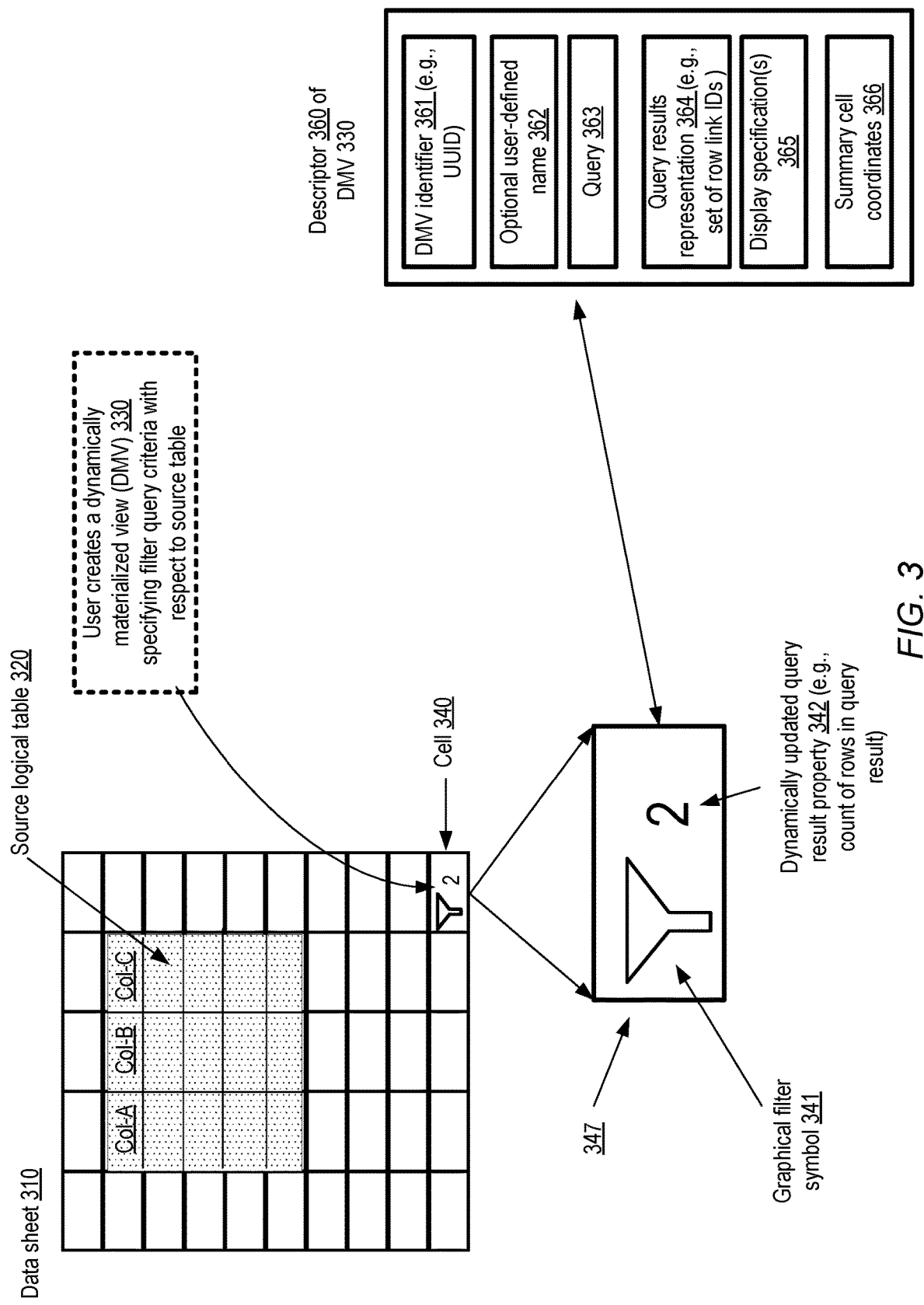
FIG. 3 illustrates an example creation of a dynamically materialized view associated with a logical table of a data sheet, according to at least some embodiments.

FIG. 3 illustrates an example creation of a dynamically materialized view associated with a logical table of a data sheet, according to at least some embodiments. In the depicted embodiment, a data sheet 310 may be used to store a data set of an application at an SDMS similar to SDMS 120 of FIG. 1, and a logical table 320 may be created in response to a programmatic request from a client. As shown, table 320 may comprise some number of rows and columns. The client may create a dynamically materialized view (DMV) 330 by entering a function (e.g., a "Filter" function) as the formula for a cell 340 of the data sheet 310 (or any other data sheet of the workspace in which data sheet 310 is included) in the depicted embodiment. The parameters of the function may include the filter query criteria to be used to determine whether a given row of the source logical table 320 is to be included in the materialized view. Such query criteria may be expressed as predicates on one or more of the columns (e.g., Col-A, Col-B and/or Col-C in the depicted example scenario) of the source logical table—e.g., if Col-B contains numerical values, the predicate "Col-B>0" or the equivalent may be used to filter only those rows in which Col-B's value is more than zero. Note that in at least some data sheets-based storage systems, strong data typing may not be enforced for values stored in the sheets, so in some cases a given column of a table such as 320 may include values of multiple data types—e.g., some values may be integers, others may be strings, others may be dates, and so on. In such a scenario, the SDMS may decide how to transform or cast a given value in a column into a data type that can be used to check whether a query predicate or clause is satisfied in some embodiments. Alternatively, in some embodiments, when evaluating a query of a DMV (or a FindRow( ) function) the SDMS may ignore rows whose data types cannot be mapped to a query predicate's data type, or issue warnings or error messages when a data type mismatch occurs when a query is evaluated.

In cell 340 in the depicted embodiment, whose formula defines a DMV on source table 320, a summary representation of the result of the DMV query may be displayed. As shown in the enlarged representation 347 of cell 340, the summary representation may for example include a graphical filter symbol 341 as well as a dynamically updated query result property 342 in some embodiments. The dynamically updated query result property may, for example, comprise a cardinality or count of the rows that currently satisfy the DMV's filter query. Other examples of dynamically updated query result properties may include, for example, a binary value (zero to indicate that no rows satisfy the query, and 1 to indicate that at least one row satisfies the query), a timestamp indicating when the most recent query result was computed, or some combination of such elements in different embodiments. In one embodiment, a DMV with a low cardinality may be displayed by enumerating the respective row link displays for one or more of the result rows of the DMV filter query.

A descriptor 360 indicating various properties of the DMV 330 may be generated and stored at the SDMS, e.g., in a metadata repository similar to repository 155 shown in FIG. 1. The descriptor 360 may, for example, include a DMV identifier 361 (such as a UUID), an optional user-defined name 362 for the DMV (e.g., "Sales-dept-DMV"), the DMV filter query 363, a representation 364 of the most-recently-computed results of the filter query, one or more display specifications 365 and/or coordinates of the summary cell 340 whose formula defines the DMV in some embodiments. In at least some embodiments, the representation 364 of the results may include the row identifiers of the source table rows that satisfy the query. The display specification(s) 365 may indicate the contents to be displayed in a summary representation (e.g., in cell 340) of the DMV, and/or the contents to be displayed in an expanded representation of the DMV (not shown in FIG. 3) which may comprise values of one or more of the columns of the query result rows. In some embodiments, the contents of the descriptor 360 shown in FIG. 3 may be distributed among several different data structures instead of being included in a single data structure or record. In various embodiments, the SDMS may store one or more internal records or indications of the association of the summary cell 340 with the DMV 330—e.g., a record representing the contents of the cell 340 may include the DMV identifier 361, and/or the descriptor 360 may include the summary cell coordinates 366.

The DMV 330 may be referred to in any of several ways, e.g., from other cells of the data sheet or from sheets-based applications in the depicted embodiment. For example, the cell coordinates of summary cell 340 may be used to refer to the DMV as part of a formula of another cell; when the formula of the other cell is evaluated, the current results of the query 363 may be obtained as part of the evaluation. In another example, a user-defined name 362 may be used within a formula of another cell. Just as in the case where the coordinates of cell 340 were used in the formula, evaluation of a cell formula that includes the user-defined name 362 may also include obtaining the current results of the query 363. In at least some embodiments, a DMV may be referred to by containing it in a column of a table row—e.g., the syntax [Tasks] in a row of a Project Table may be used to refer to a DMV of the tasks related to the project represented by that row.

If and when the contents of the source logical table 320 change, the query of the DMV may be re-evaluated in the depicted embodiment. The results stored in the descriptor may be updated if the results of the query change. In various embodiments, the dynamically updated query result property 342 may be modified as soon it changes, and/or contents of an expanded view of the DMV may be updated as well. In some embodiments, notifications may be transmitted to applications that utilize the DMV (e.g., to populate a portion of a layout of a screen at a phone or tablet at which application output is shown) to indicate that the result of the DMV filter query have changed. In response to such notifications, in some embodiments a refresh request may be sent to the SDMS to provide the updated results, and the application's output may be modified accordingly. In some embodiments, updates to the summary representation and/or the expanded representation of a DMV may be deferred, e.g., until programmatic requests to refresh the summary or expanded views are received at the SDMS. Note that in various embodiments, multiple DMVs may be defined on a given logical table (or even using the same filter query on a given logical table); each such DMV may be assigned a unique identifier and treated as a separate view. In at least one embodiment, the query results 364 may not be stored as part of a DMV descriptor—e.g., the query results may be stored separately, or only generated when needed.

Example Automated Responses to Updates to Source Logical Tables

Figure 4:
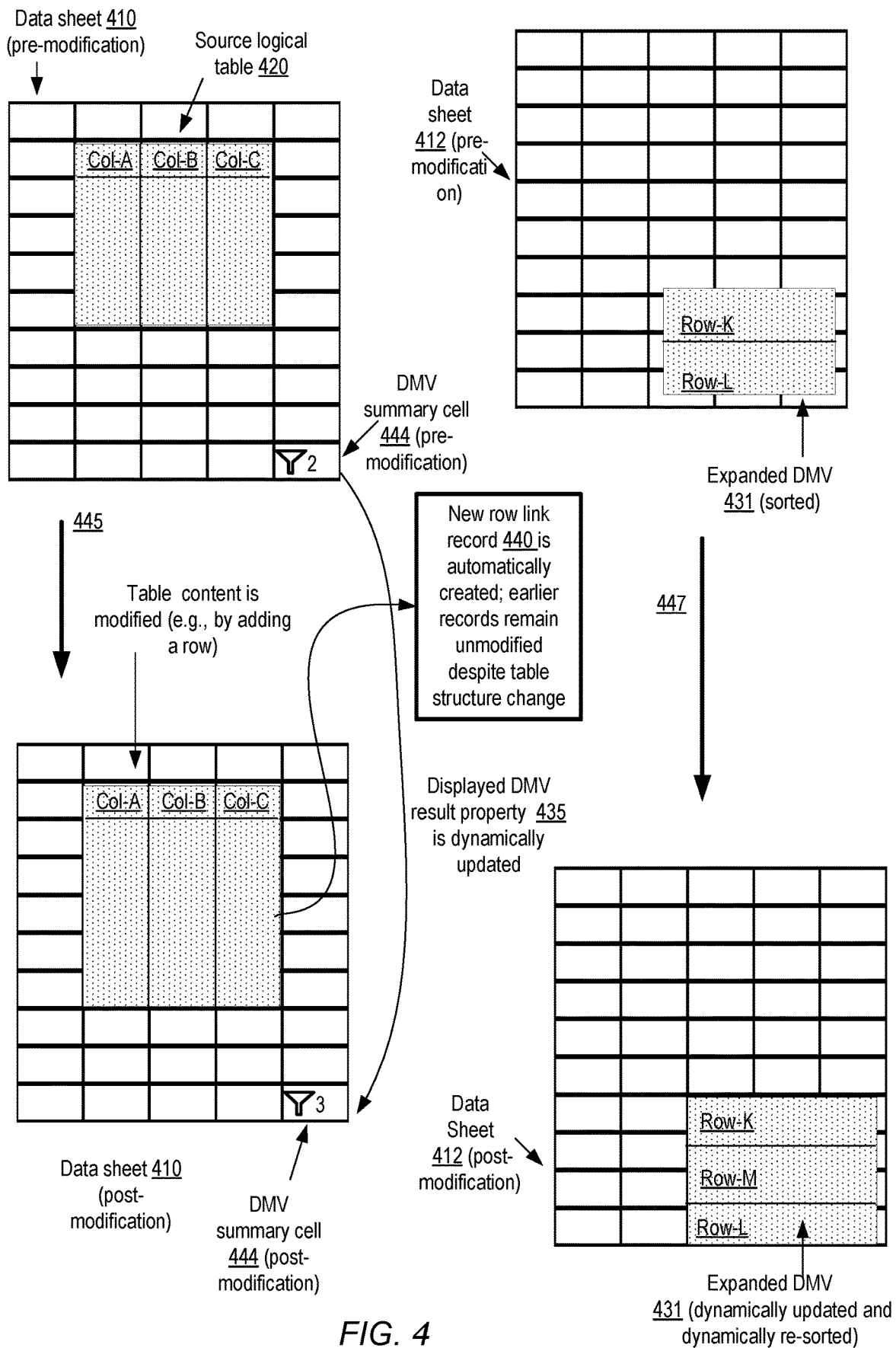
FIG. 4 illustrates example automated responses to an update of a logical table of a data sheet, according to at least some embodiments.

FIG. 4 illustrates example automated responses to an update of a logical table of a data sheet, according to at least some embodiments. A data sheet 410 stored at an SDMS similar to that shown in FIG. 1 comprises a source logical table 420 in the depicted embodiment. A dynamically materialized view is created with respect to table 420, with a summary representation of the able being presented in cell 444. At the point in time depicted in the pre-modification version of data sheet 410 shown, the summary cell 444 indicates that the number of rows that satisfy the DMV's filter query criteria is 2.

In another data sheet whose pre-modification state is shown in element 412, an expanded representation 431 of the DMV, illustrating one or more columns of two rows that satisfy the DMV query, with the rows sorted according to a client-specified criterion, is also shown in the pre-modification state.

As indicated by arrow 445, contents of the source table 420 are modified in the depicted embodiment, e.g., by adding a row. A new row link record 440 may be created automatically in the depicted embodiment. Earlier-created row link records may remain unmodified despite the change in the structure of the source table 420, as indicated in element 440. Each such earlier-created row link record may continue to represent the content of the same rows which were being represented prior to the addition of the row.

In the depicted example scenario, when the contents of the source table 430 change, the query of the DMV whose summary representation is shown in cell 440 may be re-executed, and three rows may now satisfy the query instead of two rows. The displayed DV result property (the cardinality of the query result) may be dynamically update (the number 2 may be replaced by the number 3), as indicated in the post-modification DMV summary cell 444.

In addition, as indicated by arrow 447, the changes may also be propagated, as soon as they are made, to the expanded representation of sorted DMV 431; the expanded representation may be dynamically updated and also dynamically re-sorted in the depicted example scenario. That is, the relative positions of the rows of the expanded representation may be rearranged as a result of re-sorting. For example, while Row-L used to be presented immediately below Row-K prior to the modification of the source table, Row-M may be inserted between Row-K and Row-L due to the source table modification. Note that similar rearrangements of rows in expanded representations of DMVs may occur even without a change to the total count of query result rows in some cases—e.g., as a result of changing a value in a sort column (or a column whose values are used as part of the sort criterion for the referencing table) within a row in the source table, the rows in the expanded DMV representation may be automatically rearranged in various embodiments.

Example Automatically Populated Pick List Interface Element

In some embodiments, a graphical user interface component referred to as a pick list may be used to populate table cells using row links. FIG. 5 illustrates an example use of an automatically generated pick list to indicate relationships between rows of a pair of logical tables, according to at least some embodiments. As shown, in the depicted embodiment, at least two data sheets 510 and 512 may be used to store data sets related to an application at an SDMS similar to SDMS 120 of FIG. 1. When a collection of cells of sheet 510 is designated as a logical table 549, a row link record set 522 for the newly-created table may be generated and stored automatically in a workspace-level row link repository 560 in the depicted embodiment. For example, row link records 540A-540D may be stored corresponding to table 549.

The row link repository 560 may comprise respective row link sets form various other tables of the workspace, such as set 532 comprises row link records 540K-540M for a table 547, and row link record set 533 comprising row links 540P-54-R for table 550 created within data sheet 512.

A client of the SDMS may use a drop-down graphical user element called a pick list 570 to populate one or more cells of a given table such as 550 with values that are based on contents of other tables. For example, when the client indicates that a pick list 570 is to be used to populate a given target cell of table 550, the SDMS may provide an interface enabling the client to indicate a source table. After the source table (e.g., table 549 or 547) is indicated, the rows of the source table may be made available for selection in the pick list, and the client may pick any row. Internally at the SDMS, row link identifiers may be used to populate the pick list, while to an end user the values shown in the pick list may depend on the display specifications of the row link records. The row identifier of the selected row may be stored in the target cell being populated in the depicted embodiment, and the content displayed in the target cell may be determined based on the display specification associated with the row identifier. In at least some embodiments, the options indicated in a pick list may represent rows of any of the tables in the workspace (and/or the rows of any DMVs created in the workspace), thus allowing SDMS clients to represent immutable relationships between any two rows of any two tables or views. Note that at least in some embodiments, pick lists may be used to populate any cell of a data sheet, whether that cell is part of a logical table or not; as such, the use of pick lists may not be limited to populating tables.

Example Use of Filter Functions

Figure 6:
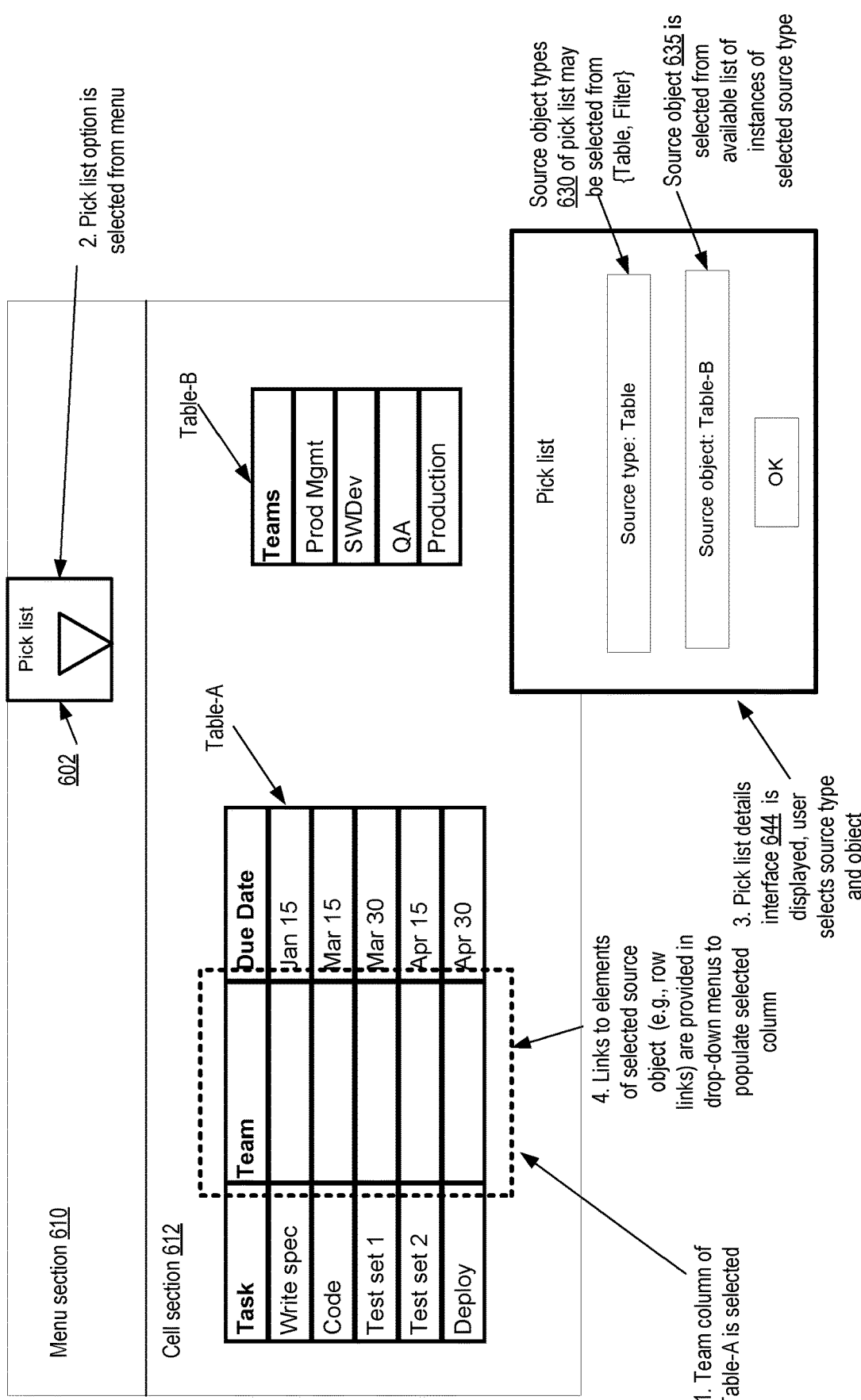
Figure 7:
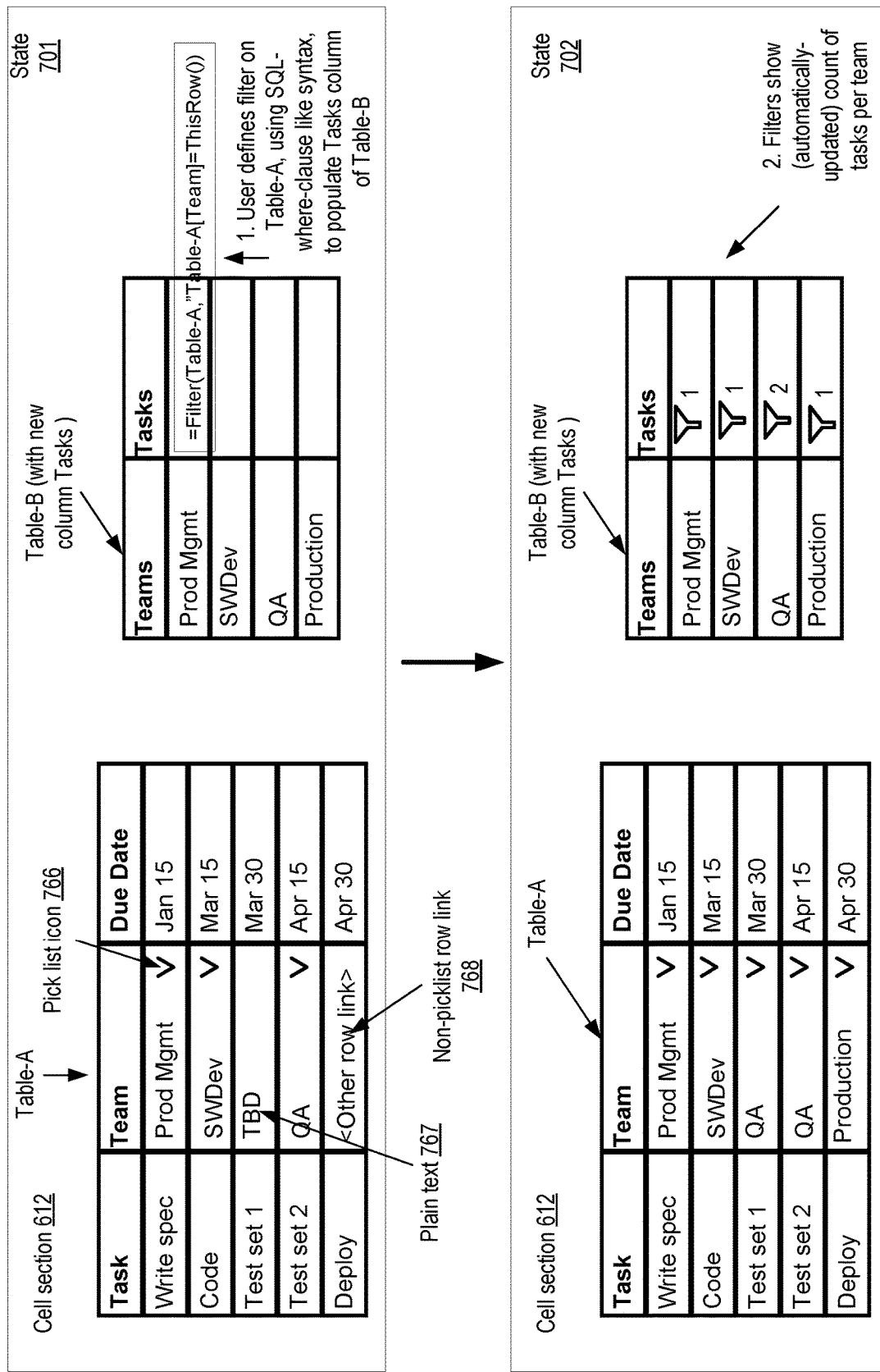

In some embodiments, as indicated earlier, filter functions (with a syntax similar to "Filter(<parameter-list>)") may be used to generate dynamically materialized views. FIG. 6, FIG. 7 and FIG. 8 collectively illustrate a simple example use of filter functions to indicate relationships among rows of a pair of logical tables, according to at least some embodiments.

In FIG. 6, a subset of elements of a graphical user interface for a data sheet of an SDMS similar to SDMS 120 of FIG. 1 is shown. The graphical user interface comprises a menu section 610, comprising a pick list selection menu element 602, and a cell section 612 comprising a plurality of cells arranged in a two-dimensional grid. Within cell section 612, two logical tables (Table-A and Table-B) have been created. Table-A comprises three columns, named "Task", "Team" and "Due date" respectively, and is used to store information about the teams (i.e., groups of employees) assigned to respective tasks of an example software development project as well as the due dates of those tasks. Table-B contains information about the teams that can be assigned to the tasks shown in Table-A. At the point of time represented in FIG. 6, Table B has a single column called "Teams", in which four teams are named: "Prod Mgmt"

(product management), "SWDev" (software developers), "QA" (Quality Assurance) and "Production" (a team in charge of a production environment for the applications/programs being developed). The tasks to which teams are assigned include "Write spec" (writing a specification of the software program(s) being developed), "Code" (writing the source code for the programs), "Test set 1" and "Test set 2" (representing two phases of testing of the code), and "Deploy" (representing deployment of the tested code to a production environment). Respective due dates have been entered into Table-A, but teams have not yet been entered.

As shown in the text labeled 1, the "Team" column of Table-A may be selected by an SDMS client or user to populate the column's values. The pick list menu element 602 may be selected from the menu section 610, as indicated by the text labeled 2. This may indicate to the SDMS that a pick list is to be used to populate at least some elements of the selected "Team" column.

As shown in the text labeled 3, a pick list details interface element 644 may be displayed at this point. Within the pick list details element, the client may be able to select the source object type 630 for which pick list rows are to be selected. For example, the source objects may include either tables or DMVs (referred to as "Filters" in the user interface), and the client has selected "Table" as the source object type in the depicted scenario. After the object type is selected, a list of accessible/available instances of that type may be shown (e.g., names of all the tables created in the workspace to which the client is granted access); in the depicted scenario, the client has selected Table-B as the source object 635. The OK button of the pick list details interface 644 may be used to submit the request for picking rows from the specified table or DMV (filter) by the client.

After the client has indicated the source object for populating the "Team" column via the pick list, representations of respective rows of the source object may be displayed in various embodiments, and the client may select the specific row to be linked to a given cell of the Team column from the respective rows. For example, for the "Write Spec" task, the row corresponding to "Prod Mgmt" may be selected, while for the "Code" task, the row corresponding to "SWDev" may be selected, and so on. The representations of the rows of the source object that are shown to the client (enabling the client to select one of the rows for each cell of the "Team" column) may be based on the display specification of the corresponding row link records of the source object in various embodiments. Corresponding to each cell Ck of the "Team" column for which a row Rm is selected via the pick list, the row identifier of the selected row Rm may be stored in some embodiments as an indication that the cell Ck is associated with Rm.

Within FIG. 7, in the state 701 of cell section 612 of the example data sheet introduced in FIG. 6, several of the cells of the "Team" column of Table-A have been populated using a pick list, with respective links established from each Table-A row to one of the rows of Table-B. For example, the teams for "Write spec", "Code" and "Test set 2" have been selected using a pick list. In at least some embodiments, a visual indication that a cell was populated using a pick list (e.g., icon 766) may be provided in the cell. In at least some embodiments, a visual indication may also be provided if the contents of a cell are based on a row link (which may or may not have been selected via a pick list). For example, the text "Prod Mgmt" in the "Write spec" row may be shown in a particular color or font selected to indicate that it uses a row link. As shown in state 701, not all the elements of a column may be of the same type—e.g., while the "Prod Mgmt", "SWDev" and "QA" elements are row links selected via a pick list, the plain-text "TBD" 767 may be used for the "Test set 1" task, and a row link 768 that was not selected via a picklist may be used for the "Deploy" task. Such heterogeneity regarding permitted data types may be familiar to users of conventional spreadsheets, and may make it easier for such users to adapt to the SDMS while also taking advantage of the advanced relational database-like features of the SDMS. In state 701, the client has also expanded Table B, adding a new "Tasks" column, with the goal of summarizing the tasks that are assigned to each Team represented in Table-B. In order to do so, the client may use a graphical user interface element to add the Tasks column and then use a "Filter" function to define a dynamically materialized view of the tasks assigned to each team.

As shown, syntax similar to "=Filter(Table-A, "Table-A [Team]=ThisRow( ))" may be used for the formula of the "Tasks" cell for the "Prod Mgmt" row in at least some embodiments. The example Filter function shown may be processed as follows: the first parameter, Table-A, may be identified as a source object of a DMV, and the second parameter "Table-A[Team]=ThisRow( )" may be interpreted as the query to be used to select rows of the source object that are to be included in the DMV. A rich, highly expressive SQL-like syntax may be supported for the queries of Filter functions in various embodiments. The query shown in state 701 utilizes a self-reference function "ThisRow( )", which evaluates to the row in which the function is entered as part of a cell formula. In effect, the result of evaluating ThisRow( ) in the first row of Table-B is the row identifier of that first row, the result of evaluating ThisRow( ) in the second row of Table-B is the row identifier of the second row, and so on. The query illustrated would return all rows of Table-A in which the Team column value is the row identifier of the current row of Table-B; as such, the count of rows returned for the "Prod Mgmt" row would match the number of rows in Table-A in which "Prod Mgmt" is the team assigned. In some embodiments, respective Filter functions similar to that shown in state 701 may be defined for each of the Tasks column of Table-B by the client with the help of a graphical user interface element that allows the client to specify the same function for each row without having to re-enter the entire syntax of the function.

In state 702 shown in FIG. 7, the Team column of Table-A has been fully populated using a pick list, and the Tasks column of Table-B has also been fully populated using the Filter function to create a respective summary view of a DMV in each of the cells of the Tasks column. A filter symbol (similar to a funnel) representing the DMV is shown in each of the cells, along with a dynamically update representation of a property of the current result of evaluating the DMV query. In the depicted example, the dynamically updated property is the cardinality of the query result—that is, the number of rows of Table-A that satisfy the query. Thus, for example, because there are two rows in Table-A with "QA" as the Team, the Tasks column for the QA team displays the numeral "2". Each of the other rows of Table-B shows a numeral "1" in the Tasks column, along with the filter symbol, because there is currently only one row in Table-A for the corresponding team represented in the Teams column of Table-B—that is, only one row in Table-A refers to the "Prod Mgmt" team, the "SWDev" team, and the "Production" team respectively. If and when a change is made to the contents of the Team column in Table-A, the DMVs of Table-B may be dynamically re-evaluated, and if necessary the summary values shown in the Tasks column may be updated. For example, if the "Deploy" task were also assigned to the "QA" team, the number shown in the QA row's Tasks column may be instantaneously (or near-instantaneously) changed to "3", and the number shown in the Production row's Tasks column may be instantaneously (or near-instantaneously) changed to "0".

In state 801 of the cell section 612 shown in FIG. 8, another column has been dynamically added to Table 2, and has been populated using a pipelined Filter function. This new column is titled "Task-by-April1", and is used to represent the subset of tasks, for each team of Table-B, that have a due date (shown in the "Due Date" column) before April 1 in the depicted example. The DMVs defined for the Tasks column already have information about the rows of Table-A that match the team names of Table-B. Note that although these existing DMVs are displayed in summary form, the use of row links as the underlying objects used to associate the rows of Table-A to the Tasks column of Table-B enables information regarding the Due Date column to be obtained via the row links. Generally speaking, a pipelined Filter may be defined as a Filter function whose input object (the object on which a query is to be run) is itself a DMV corresponding to another Filter. As such DMVs may be treated analogously to logical tables in at least some embodiments, at least for the purposes of defining DMVs via Filter functions.

Assume that the DMV assigned to the Tasks column of the Prod Mgmt row of Table 2 can be referred to using the syntax "[Tasks]" in the scenario depicted in FIG. 8. Syntax similar to=Filter([Tasks], "Table-A[Due Date]<=Date(2019 Apr. 1)") may then be used to define another filter, to be used to populate the Tasks-by-April1 column of Table-B. Note that there may be several different ways to generate the equivalent of a given pipelined DMV—e.g., a more elaborate query on the source logical table may be constructed and used in an un-pipelined or standalone DMV (such as "=Filter (Table-A, "Table-A[Team]=ThisRow( ) AND Table-A[Due Date]<=April 1")", the definition of the inner Filter may be fully incorporated into the outer Filter (as in "=Filter(Filter (Table-A, "Table-A[Team]=ThisRow( )")[Due Date]<=April 1", and so on. A given filter F1 may be referenced within another filter F2 using an identifier assigned to F1 (e.g., a user-defined name, or a name/UUID defined by the SDMS), the coordinates of a cell whose formula is used to define F1, or by providing the full definition of F1 as a parameter of the Filter call to create F2 in some embodiments.

In state 802 of cell section 812, the team name "Production" has been changed to "Ship". In accordance with a "live link" approach employed at the SDMS, the contents of the Team column of Table-A may be instantaneously or near-instantaneously updated to propagate the change made to Table-B—e.g., the Team name shown for the Deploy task may be changed to "Ship".

Example Dynamically Re-Sorted DMV

Figure 9:
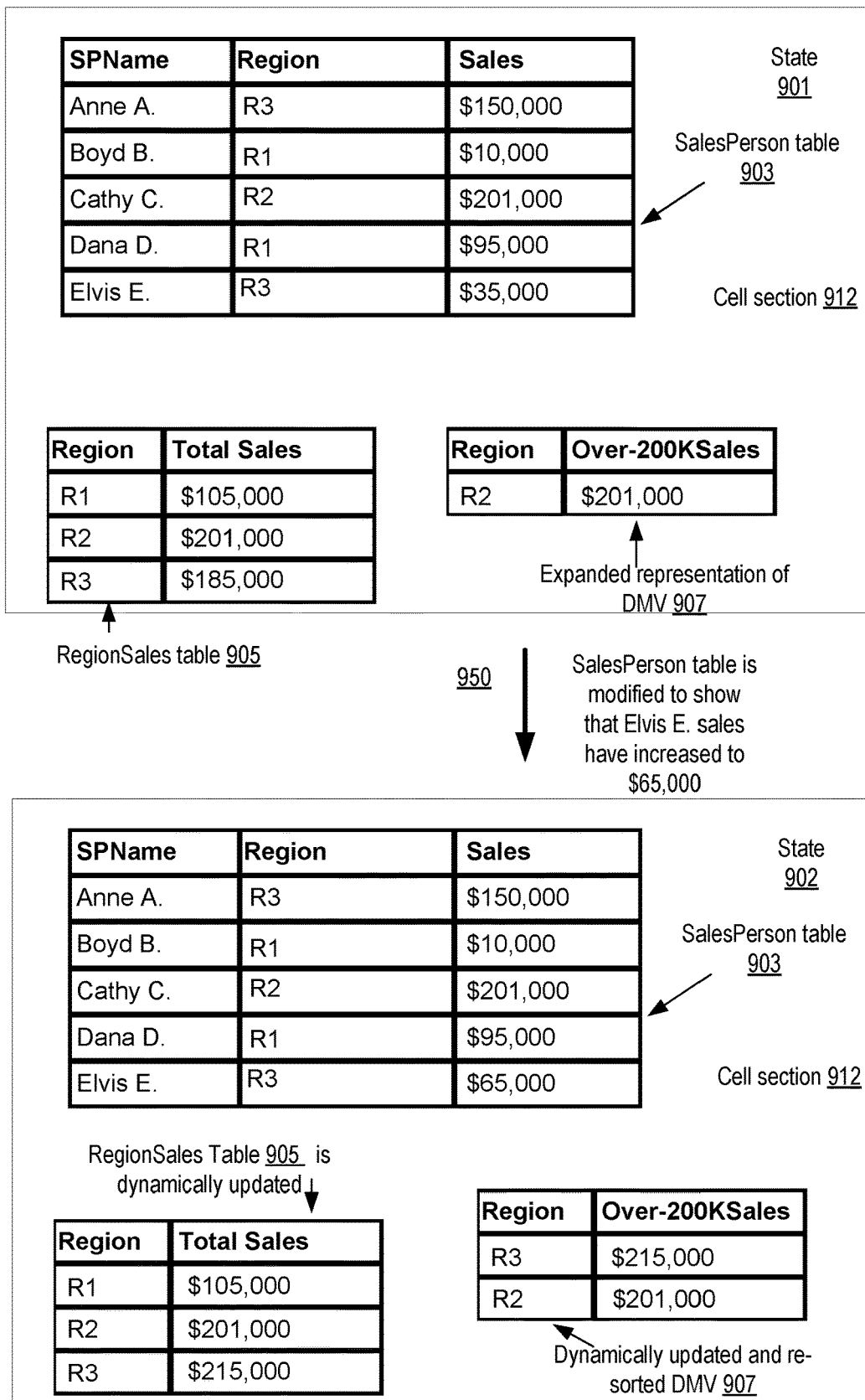
FIG. 9 illustrates an example of automated updating and re-sorting of a dynamically materialized view, according to at least some embodiments.

FIG. 9 illustrates an example of automated updating and re-sorting of a dynamically materialized view, according to at least some embodiments. In state 901 of a cell section 912 of a data sheet managed at an SDMS similar to SDMS 120 of FIG. 1, two logical tables are shown.

SalesPerson table 903 contains information about sales persons of an example organization with employees distributed across several geographical regions. The names of the sales persons (e.g., "Anne A.", "Boyd D.", etc.,) are shown in the SPName column, the region in which the sales person is based (e.g., R1, R2, or R3) is shown in the Region column, and the total sales achieved by the sales person over some time period, expressed in dollars, is shown in the Sales column. The RegionSales table 905 utilizes a SUM aggregation function to store, corresponding to each region indicated in the SalesPerson table 903, the total amount of sales accrued by sales persons of that region. Thus, for example, query syntax logically equivalent to "[Total Sales]=SUM (Filter(SalesPerson,"SalesPerson[Region]=[Region]") [Sales]) may be used to populate the Total Sales column of RegionSales table 905. In addition, a dynamically sorted DMV 907 may be generated using syntax similar to=Filter (RegionSales, "RegionSales[Total Sales]>200,000" ORDER BY RegionSales[Total Sales] Desc"), which shows regions with total sales greater than $200,000, in descending order of total sales. In state 901, the region R2 is the only region with sales that exceed $200,000 (due to Cathy C., whose sales amount is $201,000) so only one row is shown in the expanded view of the DMV. In the source RegionSales table of the DMV, rows for each of the three regions are shown. The row for region R3, in which two employees are based (Anne A. with $150,000 in sales, and Elvis E., with $35,000 in sales) shows a total sales amount of $185,000, while the row for region R1 shows a total sales amount of $105,000 (the sum of Boyd B.'s $10,000 and Dana D.'s $95,000).

As indicated by arrow 950, the SalesPerson table 903 may be modified to indicate that Elvis E. sales figures have increased to $65,000. The contents of the Total Sales column of RegionSales table 905 may be modified instantaneously, or near-instantaneously, in state 902 of the data sheet in the depicted embodiment to reflect the change to the source logical table 903, with the total for R3 going up to $215000 (since Elvis E.'s sales have increased by $30,000). In addition, the expanded view of the DMV 907 may also be dynamically updated and re-sorted due to the changes: now, (a) an additional row representing R3 is shown in DMV 907 and (b) based on the sort criteria, the row for R3 in the DMV 907 is above the row for R2, even though in the RegionSales table, the row for R3 is below the row for R2. As such, dynamic updates may not only change computed values of cells containing DMV results (as in the RegionSales table), but also rearrange the presented rows of a DMV, illustrate one example feature that provides a superior user experience for SDMS users relative to users of other types of storage services. Note that in at least some embodiments, dynamic updates of the kind illustrated in FIG. 9 may be utilized not just within data sheets but also in applications that use data sheets for their data sets. For example, when the kind of change that is shown in FIG. 9 is made to the data set of an application deployed potentially to hundreds or thousands of application execution platforms (such as laptops, desktops, phones, tablets, audio-driven intelligent assistant devices, augmented reality/virtual reality interfaces, and the like), the application output presented at those execution platforms may also change near-instantaneously. In some embodiments, the SDMS may also support the dynamic re-sorting of logical tables (for example, the RegionSales table may itself be sorted dynamically on [Total Sales]), in addition to supporting dynamic re-sorting of DMVs.

Example DMV Based on Presence-and-Absence Criteria

Figure 10A:
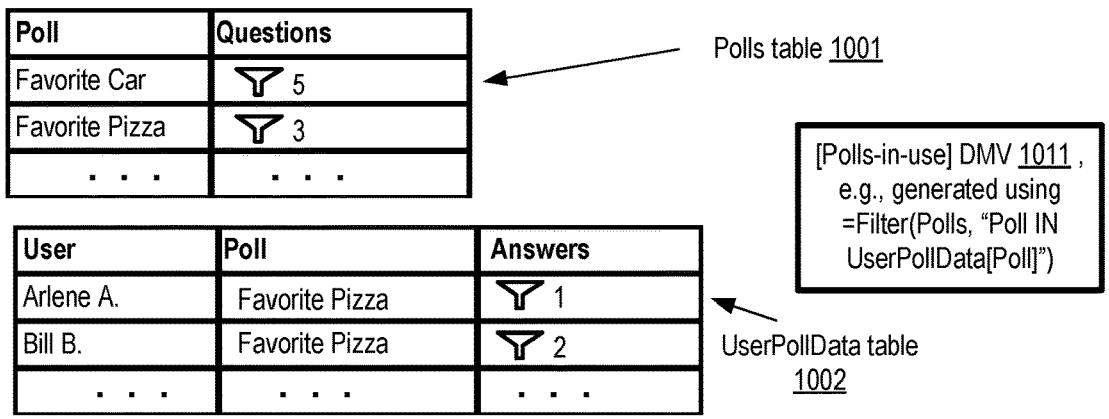
FIG. 10a and FIG. 10b collectively illustrate examples of the use of dynamically materialized views defined using presence and/or and absence criteria, according to at least some embodiments.
Figure 10B:
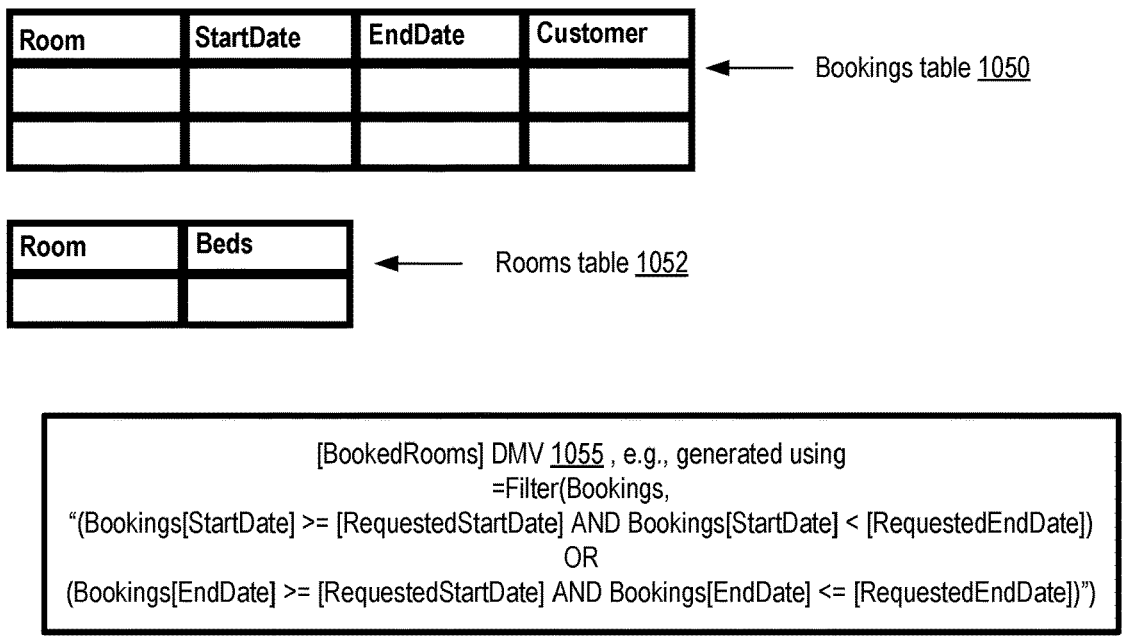

In some embodiments, an SDMS may support the ability to define DMVs based on the presence of a row (or group of cells) in one source data set, and the concurrent absence (or presence) of that row (or group of cells) in another source data set, e.g., without requiring locks or other conventional concurrency control mechanisms to be used. FIG. 10a and FIG. 10b collectively illustrate examples of the use of dynamically materialized views defined using presence and/ or and absence criteria, according to at least some embodiments. FIG. 10a shows a pair of logical tables associated with a polling application, as well as a DMV generated from the pair. A Polls table 1001 comprises a Poll column, and a Questions column. Entries in the Poll column indicate the names of various polls being conducted (e.g., a Favorite Car pool, a Favorite Pizza poll, etc.) among a group of users or individuals. The Questions column represents, for each poll, a set of questions that may be asked in the poll. For example, in the Favorite Pizza poll, the questions may include "What is your favorite pizza topping?", "What is your favorite pizza crust type?" etc. The questions themselves may be stored in a different table not shown in FIG. 10a. A DMV may be generated on the table containing questions to populate the Questions column entries of the Polls table— e.g., as shown, the Favorite Car poll may currently have 5 associated questions, while the Favorite Pizza poll may currently have 3 associated questions. The UserPollData table 1002 may comprise three columns: a User column identifying users, a Poll column indicating a poll in which the user has participated, and an Answers column indicating the number of questions of that poll that have been answered by the user. In the depicted embodiment, the SDMS may support the capability of generating DMVs that are defined in terms of a presence requirement with respect to a data set, as in the case of the Polls-in-use DMV 1011. Using syntax similar to "=Filter(Polls, "Poll IN UserPollData[Poll]"), the set of polls that have at least one answered question by at least one user may be determined dynamically in the depicted embodiment. The source data sets in this example are (a) the Polls table, and (b) the set of Polls listed in the Poll column of the UserPollData table, and DMV 1011 (using the "IN" syntax) may be used to determine the intersection of these two source data sets.

Figure 11:
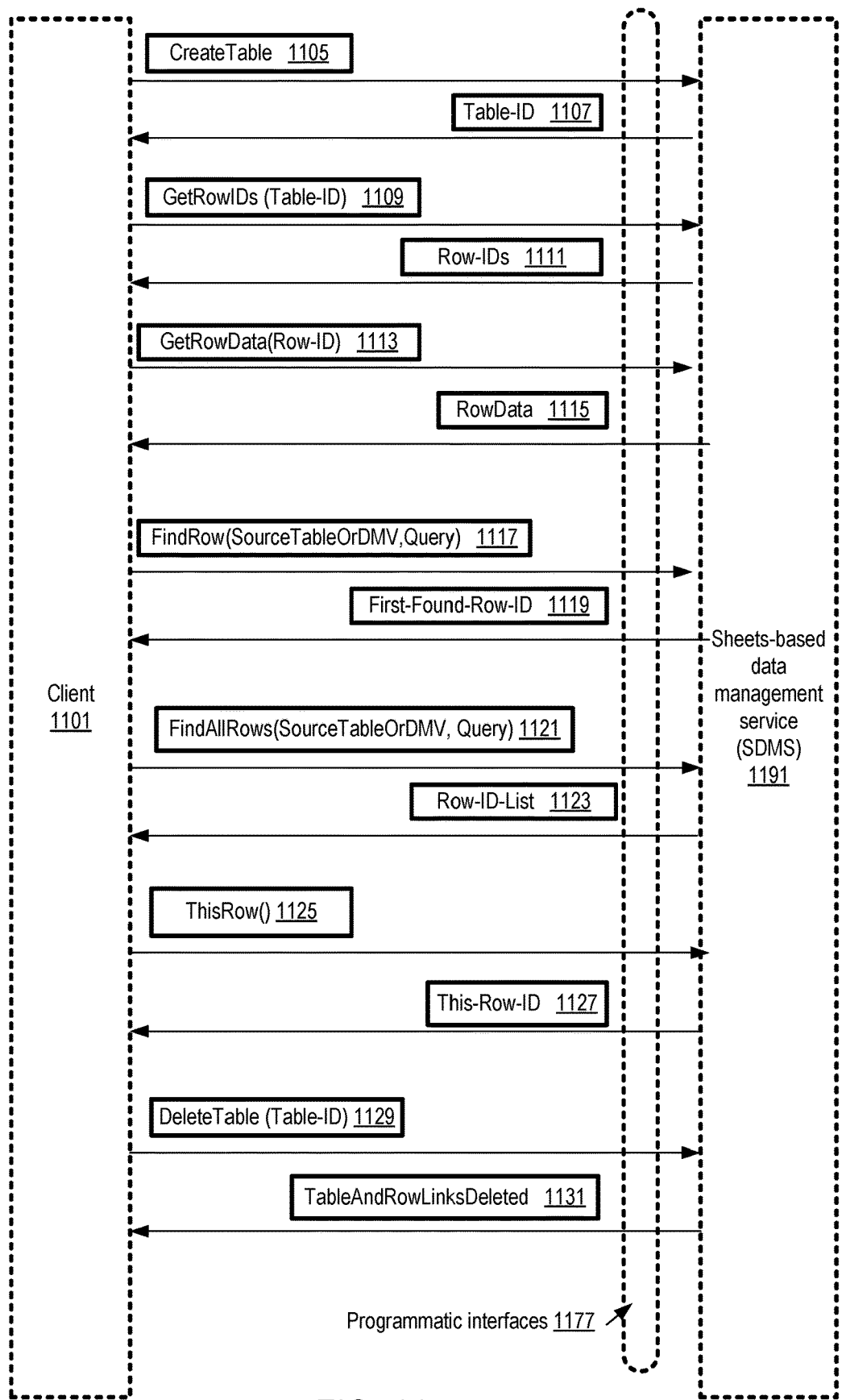
FIG. 11 and FIG. 12 illustrate example programmatic interactions between clients and a sheets based data management service, according to at least some embodiments.
Figure 12:
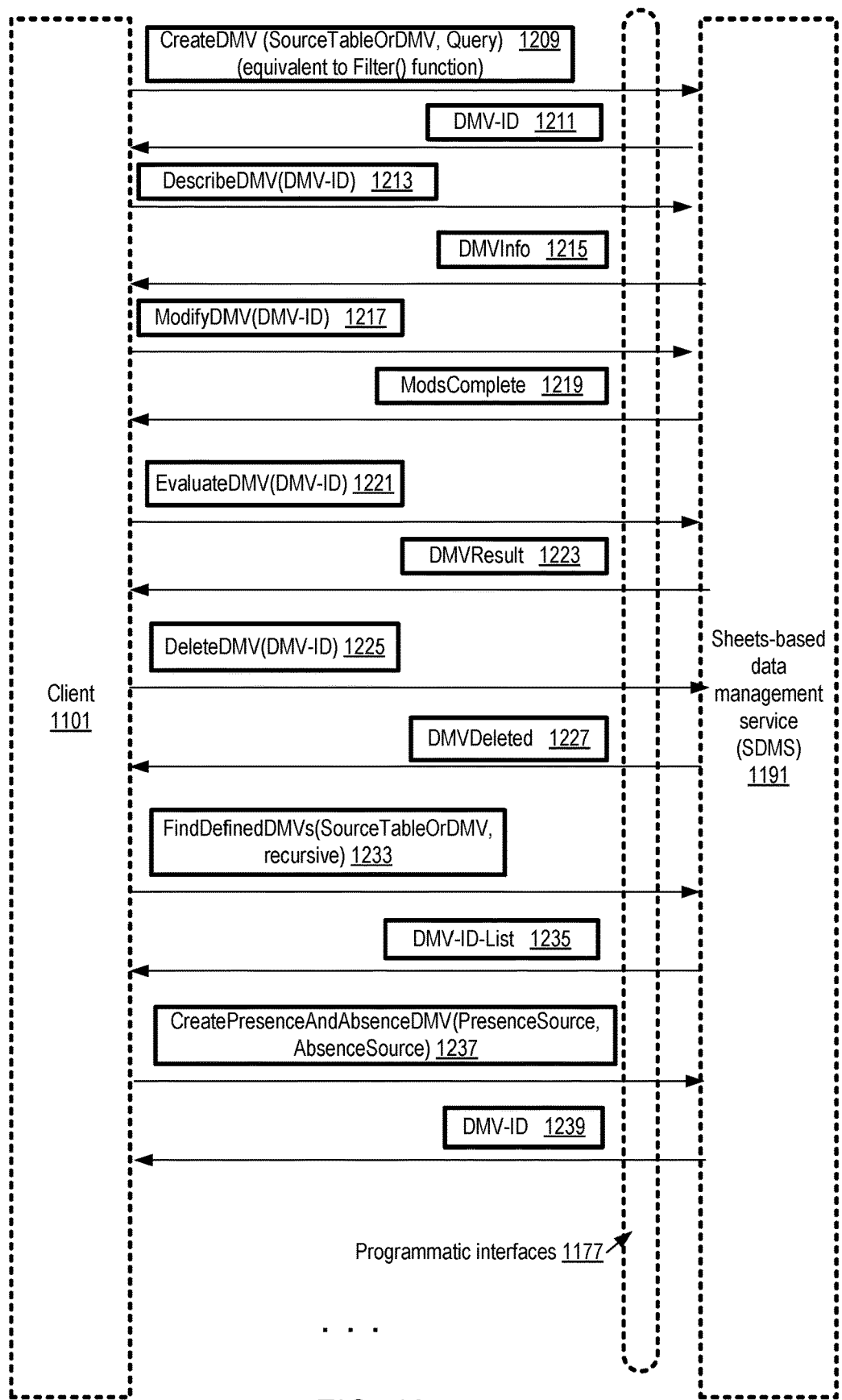

FIG. 10b illustrates an example use of a dynamically materialized view defined using a combination of a presence criterion and an absence criterion. A portion of an example data sheets based application pertaining to the reservation of hotel rooms is implemented using two tables: a Bookings table 1050 and a Rooms table 1052. The rooms table 1052 indicates the number of beds (in the Beds column) in each of various hotel rooms (identified in the Room column). Each row of the Bookings table 1050 represents a reservation for a room (indicated in the Room column, which may be populated via row links to the Rooms table), StartDate and EndDate columns for the start and end dates of the reservation, and an indication of the customer for whom the room is reserved (in the Customer column). Assume that a reservation is to be made for some customer, based on a requested start date (RequestedStartDate) and a requested end date (RequestedEndDate). In such a scenario, a BookedRooms DMV 1055 may be generated to identify the set of reservations which are in conflict with the requested date, using syntax similar to that shown in FIG. 10b. Then, a second DMV 1056 may be generated, using the BookedRooms DMV as one of its source data sets and the Rooms table as a second source data set, to identify rooms that are available during the requested date range. Syntax similar to Filter(Rooms, "NOT (Rooms IN [BookedRooms][Room])") may be used in the depicted embodiment to identify rooms that are (a) present in a source data set comprising the Rooms table and (b) absent from the set of already-reserved rooms with respect to the target dates. Note that both the BookedRooms DMV and the FreeRooms DMV may be updated near-instantaneously as soon as a change is made to the underlying Bookings table in the depicted embodiment.
Example Programmatic Interactions FIG. 11 and FIG. 12 illustrate example programmatic interactions between clients and a sheets based data management service, according to at least some embodiments. As mentioned earlier, a sheets-based data management service (SDMS) 1191 similar to SDMS 120 of FIG. 1 may implement a set of programmatic interfaces 1177 that can be used by clients to submit various types of requests pertaining to the configuration and use of logical tables, row link records and dynamically materialized views (DMVs). Such programmatic interfaces may, for example, include a set of application programming interfaces (APIs), command-line tools, web-based consoles or tools, graphical user interfaces (e.g., interfaces similar to those of other spreadsheet tools), audio interfaces and so on in different embodiments. In various embodiments, the kinds of programmatic requests shown in FIG. 11 and FIG. 12 may be utilized from within application authoring tools (similar to tools discussed below in the context of FIG. 14) to generate various kinds of data sheets based applications.

Using interfaces 1177, a client 1101 may submit a CreateTable request 1105 in the depicted embodiment, designating a set of one or more rows and one or more columns within one or more data sheets as a logical table that is to be treated as a unit for certain types of operations. In response, the SDMS 1191 may generate and store metadata pertaining to the table, included for example a unique table identifier Table-ID, formatting information, table member cell coordinates, table column identifiers or name, etc. In at least some embodiments, corresponding to individual rows of the table, a respective row link record comprising an immutable row identifier (similar to the row link records indicated in FIG. 2) may be generated and stored at the SDMS. To store indications of relationships or bindings between another cell (in the same data sheet as the table that was just created, or in another data sheet) and a given row of the created table, the immutable row identifier of the row may be used as a pointer. As mentioned earlier, the row identifier may be termed immutable in various embodiments because it remains unchanged regardless of the changes in structure of the table containing the row for which the row link record is generated. In some embodiments, additional metadata such as a display specification for the row, and/or user defined names for the row may optionally be stored in the row link record. Display specifications and/or user defined names may be indicated after the row link record is stored in some embodiments—that is, at the time that a table creation request is submitted, an SDMS client need not necessarily specify the display specification or user defined name for the table's rows. The table identifier 1107 may be returned in response to the CreateTable request 1105 in some embodiments.

In at least some embodiments, an authorized client 1101 may request all the row identifiers of a specified table using a GetRowIDs request, and the SDMS 1191 may provide a list of row identifiers of the specified table in a Row-IDs response 1111. Note that at least in some embodiments, row identifiers may be stored as 64-bit or 128-bit numerical values, or as strings or character arrays that may not be interpretable by SDMS users, so the raw row identifiers themselves may be useful primarily for debugging and similar administrative tasks. In some embodiments, when a client 1101 requests a row identifier via a graphical interface, the display specification of the corresponding row may be used to determine the data (e.g., values of one or more columns of the row) that is displayed—that is, the internal representation of the row identifier may not necessarily be displayed. In some embodiments, a GetRowData request 1113 may be supported to enable a client 1101 to view all the content (e.g., values stored in all the cells of the row, including potentially other row identifiers) of a given row, and the content may be provided in a RowData response 1115.

A FindRow request 1117 may be submitted by a client 1101 to obtain a row identifier of a row within a source table or dynamically materialized view (indicated by the SourceTableOrDMV parameter) that satisfies a specified query (indicated by the Query parameter) in the depicted embodiment. Such FindRow( ) functions may be used to populate columns of one table with links to rows of other related tables, as shown in the context of FIG. 2. In response to a FindRow( ) request, in some embodiments the identifier of the first row that satisfies the query in the specified source object (table or DMV) may be provided in the First-Found-Row-ID response 1119. If multiple rows satisfy the query, the decision as to how to select the particular row whose identifier is to be returned in response to a FindRow( ) request may be made at the SDMS in some embodiments based on a row-ordering rule or setting—e.g., the topmost matching row may be selected in some embodiments. In at least one embodiment a client may submit a programmatic request to modify the row-ordering rule for a given table or DMV, and the modified version of the rule (e.g., a sorting criterion for the rows) may be used to select the particular row. If a client wishes to obtain identifiers of all the rows that match a query, a FindAllRows request 1121 may be submitted in one embodiment, and the SDMS 1191 may provide a list of all the row identifiers in a Row-ID-List response 1123.

As discussed earlier, in some embodiments a self-reference function ThisRow 1125 may be supported by an SDMS 1191. In response to a ThisRow request, in various embodiments the SDMS may determine the context from which the request is generated, such as a particular row within a logical table or an expanded representation of a DMV, and provide a row identifier of the particular row in the This-Row-ID response 1127.

In some embodiments, a DeleteTable request 1129 may be submitted by a client to delete the metadata (and data) associated with a table, including the table identifier, table-level metadata as well as row link records of the table. A TableAndRowLinksDeleted response 1131 may be provided in response, indicating that the table and its associated row link records have been removed from the repositories of the SDMS. In at least one embodiment, if a client requests the deletion of a table T1 whose row links are in use from some other cells outside T1, or from a data sheets based application, the SDMS may reject the deletion request and/or indicate in an error message that a currently-being-referenced table cannot be deleted until all references to the table are also deleted. In some embodiments, a request to delete a given row of a table may also be treated similarly with respect to potentially un-resolvable references. For example the SDMS 1191 may keep track of references to the row (via its row identifier), and generate an error message indicating that a row which is currently being referenced from elsewhere cannot be removed or deleted. In other embodiments, deletions of tables and/or rows may be permitted regardless of potential references to the tables and/or rows, and the problem of resolving references to the rows that may no longer work may be left to application designers/authors or other users of the data sheets. For example, in one implementation, if a cell C1 includes a reference to R1 via R1's row identifier, and R1 is deleted in response to client request (e.g., a DeleteTable request or a request to delete R1), an error message indicating an unresolvable reference may be shown in the display of cell C1.

A CreateDMV request 1209 may be submitted by a client 1101 to an SDMS 1191, as shown in FIG. 12, to request that a new dynamically materialized view (DMV) be created on a source data set (e.g., a source table or another DMV, indicated by the SourceTableOrDMV parameter). The Query parameter of the CreateDMV request may indicate the predicates/clauses that are to be satisfied by rows of the source data set to be included in the DMV. In response, the SDMS may generate and store a DMV descriptor (similar to the descriptor 360 shown in FIG. 3), comprising a DMV identifier, the query, the current results of executing the query, etc. In some embodiments a DMV identifier 1211 may be returned to the client on whose behalf the DMV is created. In some embodiments a Filter function (similar to the Filter functions discussed earlier in the context of FIG. 6, FIG. 7 and FIG. 10) may be used instead of a CreateDMV request; as such, similar tasks may be performed at the SDMS in response to an invocation of a Filter function and in response to a CreateDMV request. In at least one embodiment in which a Filter function is entered as part of a formula of a data sheet cell, a summarized representation of the DMV may be displayed in that cell, e.g., including a graphical filter symbol and a dynamically updated property of the results of executing the query defined for the filter. A display specification of a DMV and/or a user-defined name for the DMV may be submitted as part of the CreateDMV request, or in a separate ModifyDMV request submitted after the DMV is created in various embodiments.

According to some embodiments, a client 1101 may submit a DescribeDMV request 1213 to obtain information about a previously-created DMV (identified by the DMV-ID parameter), such as the query of the DMV, the display specification of the query, etc. Information about the specified DMV may be provided to the requesting client 1101 via a DMVInfo response 1215.

A ModifyDMV request 1217 may be submitted by a client to change one or more properties of a previously-created DMV, including for example the source table or source DMV, the query predicates/clauses, the display specification to be used for a summary representation or an expanded representation of the DMV, the user-defined name, and so on. After making the requested changes, the SDMS 1191 may transmit a ModsComplete response 1219 in some embodiments.

In some embodiments, an EvaluateDMV request 1221 may be submitted via interfaces 1177 to obtain the result of the DMV's query. In response, a representation of the result of executing the query may be provided in a DMVResult message 1223 by the SDMS. Note that in embodiments in which the result of executing the query is automatically re-generated and stored whenever the source table or DMV changes, the query need not necessarily be re-executed in response to an EvaluateDMV request 1221—instead, the already computed results may be provided from the descriptor or repository where they were stored in response to the most recent change to the underlying data. In some embodiments, as mentioned earlier, a client may indicate that results of a DMV query should not be re-generated automatically when the contents of the source object(s) of the DMV change, and that such evaluations should be deferred until a "refresh" request is received at the SDMS. In such a scenario, the EvaluateDMV request 1221 may serve as a refresh request.

A DeleteDMV request 1225 may be submitted to an SDMS to request that a DMV specified via the DMV-ID parameter be deleted from the SDMS repository or repositories. After the DMV's descriptor is deleted, a DMVDeleted response 1227 may be transmitted to the client 1101 in the depicted embodiment.

In some embodiments, the SDMS may support a FindDefinedDMVs request 1233, which may be used by an SDMS client 1101 to identify all the DMVs (if any) that have been defined with respect to a logical table or DMV indicated by the SourceTableOrDMV parameter. In response, a list of identifiers of the DMVs that have created on the source object may be provided in a DMV-ID-List response 1235. In one embodiment, a "recursive" parameter of the FindDefinedDMVs request may be set to true to obtain not just the list of DMVs defined on the source object itself, but also any DMVs defined on such DMVs, and so on. In one scenario, for example, on a given table T1, two DMVs DMV1 and DMV2 may have been defined, and another DMV DMV3 may have been defined on DMV2. In such a scenario, if a FindDefinedDMVs request indicates T1 as the source object, and the recursive parameter is set to FALSE, only the identifiers of DMV1 and DMV2 may be provided. However, if T1 is indicated as the source object and the recursive parameter is set to TRUE, identifiers of DMV1, DMV2 and DMV3 may be included in the DMV-ID-List. Continuing the example, if DMV2 is indicated in the SourceTableOrDMV parameter, the DMV-ID-List may only include DMV3.

In some embodiments, as discussed in the context of FIG. 10, an SDMS may support the ability to define DMVs based on the presence of a row in one source data set, and the concurrent absence of that row in another source data set, e.g., without requiring locks or other conventional concurrency control mechanisms to be used. A CreatePresenceAndAbsenceDMV request 1237 may be used for creating such DMVs, with the PresenceSource parameter indicating a source object in which a row is to be present for inclusion in the DMV results, and the AbsenceSource parameter indicating another source object in which the row is to be absent for inclusion in the DMV results. After such a DMV is created and a corresponding descriptor is stored, a DMV-ID 1239 of the newly-created DMV may be provided to the client 1101 in some embodiments. Note that in some embodiments, the query stored for such a DMV may be expressed using a syntax similar to "IN <PresenceSource> AND NOT IN <AbsenceSource>". Similar programmatic requests to create DMVS representing the intersection of two source data sets (and/or the union of two source data sets) may be supported in one embodiment.

Other types of programmatic interactions than those illustrated by way of example in FIG. 11 and FIG. 12 may be supported at an SDMS for operations associated with row link records and DMVs in some embodiments. Some of the types of requests shown in FIG. 11 or FIG. 12 may not be supported in other embodiments. As suggested by the requests in which one of the parameters is a source table or a DMV, a DMV may be treated in various embodiments analogously to a logical table. Note that in addition to the types of programmatic interactions discussed in the context of FIG. 11 and FIG. 12, in which a client may submit a request and receive a corresponding response, in various embodiments the SDMS may itself transmit notifications to clients under certain conditions. As discussed earlier, in various embodiments an SDMS may automatically notify at least some clients when membership of a DMV changes, or when the order in which the results of a DMV are to be arranged/displayed changes. Such notifications may indicate to the clients that their sheets-based data is out of date, and that a refresh/resynchronization operation may be required.

Example Multi-Service Application Authoring Environment

Figure 13:
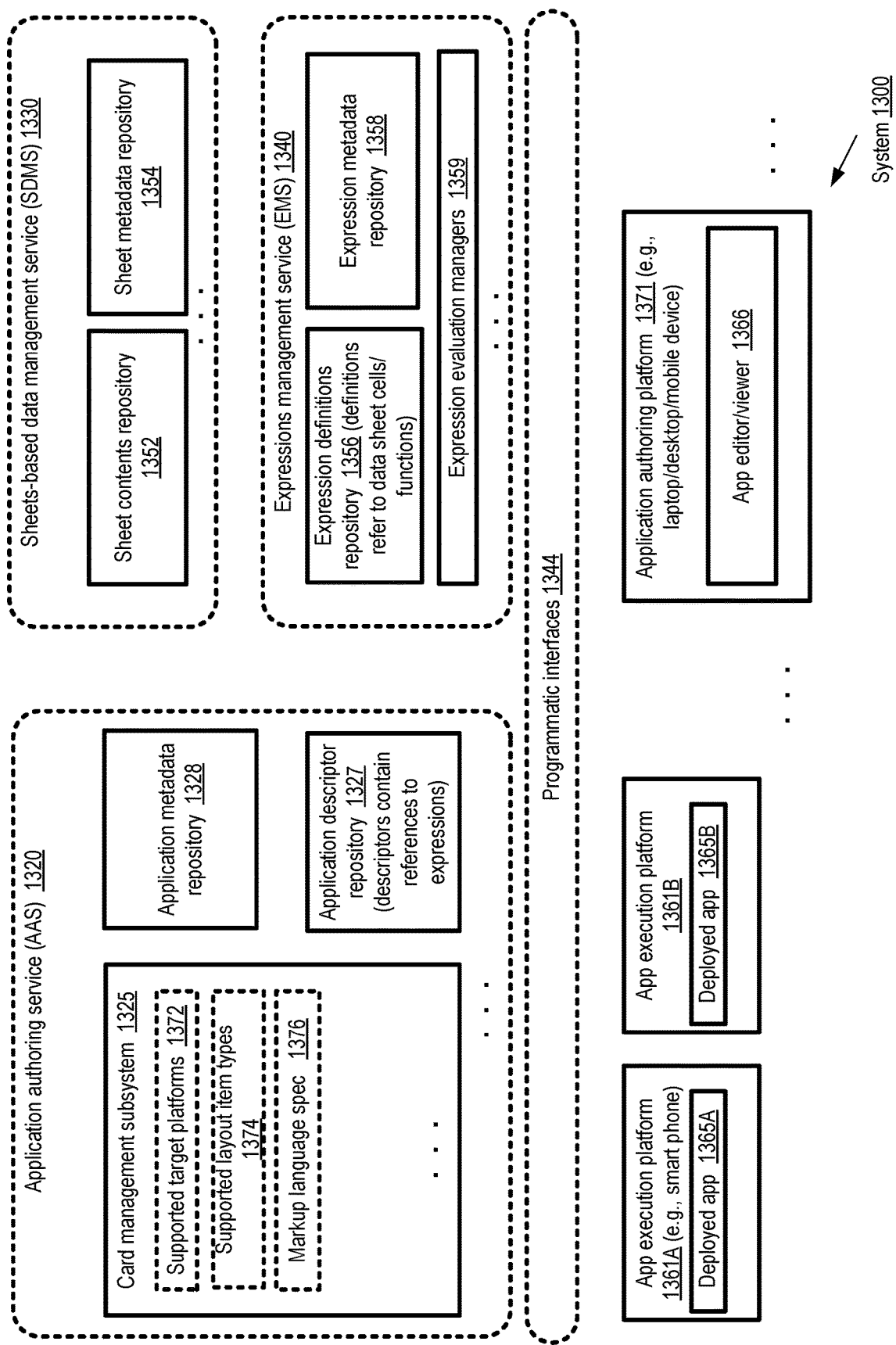
FIG. 13 illustrates an example system environment in which an expressions management service, a sheets based data management service and an application authoring service may be used collectively to develop applications for a variety of execution platforms, according to at least some embodiments.

FIG. 13 illustrates an example system environment in which an expressions management service, a sheets based data management service and an application authoring service may be used collectively to develop applications for a variety of execution platforms, according to at least some embodiments. As shown, system 1300 may include resources and artifacts of an expressions management service (EMS) 1340, a sheets-based data management service (SDMS) 1330, and an application authoring service (AAS) 1320 in the depicted embodiment. The SDMS 1330 may provide support for row link records and dynamically materialized views (DMVs) of the kind introduced above, as well as various other features of a web-of-sheets data model similar to the automatically generated hierarchies of data sheets discussed in the context of FIG. 1. The AAS 1320 may provide easy-to-use (e.g., graphical) programmatic interfaces and tools for developing applications whose data sets are stored in the SDMS and accessed via expressions referenced in the applications. Individual data sheets based applications authored using the AAS 1320 may be modeled as a collection of cards, with each card representing a layout of a screen of an application execution platform such as a mobile phone, tablet or laptop, for example. The EMS 1340 may allow users such as application authors to define and store, independently of the data sheets themselves, expressions that reference contents of cells of the data sheets in various embodiments, and to use such expressions to perform both reads and writes with respect to the underlying data sheets within the applications. In effect, an expression may be considered a cell that is not itself bound to a data sheet, but can refer to cells of one or more data sheets (e.g., via row links, DMVs and the like, accessed using logical equivalents or variants of the FindRow and Filter functions discussed earlier). Whenever the underlying sheets-based data that is referenced from an application (e.g., via an expression) changes, the SDMS may send notifications to instances of the applications. An indication of the change (e.g., an icon indicating potentially stale data, or a font or color change indicating potentially stale data) may be provided to application users in some embodiments as soon as the notification is received, and the user may refresh the application data if desired. In some embodiments, application configuration settings may be used to auto-refresh the application in response to such notifications (e.g., without requiring users to issue refresh commands). Several different attributes of a given expression may be stored at an EMS in some embodiments, including for example a formula and a formatting specification for a result of evaluating the formula. From within the applications, expressions may be referenced using unique identifiers in at least some embodiments; as a result, coordinates of the underlying data sheet cells may not be stored within the applications themselves.

At least two categories of clients may utilize the combination of network-accessible services 1320, 1330 and 1340 in the depicted embodiment, using a set of programmatic interfaces 1344: application authors or developers, and application end-users. Application authors may utilize authoring interfaces such as application editor/viewer 1366 running at authoring platforms 1371 (such as laptops, desktops, mobile devices or the like) to generate and store card-based applications in the depicted embodiment. A given card may correspond to one or more screen layouts of the flow of an application in some embodiments, with the application represented as a collection of cards corresponding to successive layouts that may be encountered by an application user as the user interacts with the application. Various subcomponents or elements of a given card or layout may be bound to respective expressions (or multiple expressions) in the depicted embodiment. Individual expressions may in turn comprise a formula that refers to one or more cells of one or more data sheets of the SDMS, e.g., either directly (by providing coordinates of the referenced cells) or using row link records' row identifiers, DMVs or the like. As part of the process of authoring an application to be managed using AAS 120, an application author may provide input specifying an expression to be used within one or more cards of an application (e.g., an expression to determine a value to be displayed in a text or numeric field of a user interface of the application). The expression may refer to one or more cells within one or more data sheets stored in the SDMS 1330, and a persistent record of the expression (including for example the formula to be used to evaluate the expression) and associated metadata may be stored in the EMS 1340, e.g., in an express definition repository 1356 and/or an expression metadata repository 1358 in some embodiments. Note that the contents of the data sheets, whose cells may be referenced in the expressions, may be stored on sheet contents repository 1352, separately from the expression definitions and expressions metadata repository in the depicted embodiment. As such, expressions may be treated as first class objects, with a separate set of programmatic interfaces supported for creating, reading, evaluating, updating and deleting expressions than the interfaces used for the corresponding operations on the data sheets. Metadata pertaining to row links, DMVs, data sheet ownership, permissions and/or other sheet properties may be stored in a sheet metadata repository 1354 of the SDMS 1330 in some embodiments.

The card management subsystem 1325 may enable applications to be developed or authored for a plurality of supported target deployment platforms 1372, such as various combinations of hardware and operating systems used for mobile phones, tablet computing devices, wearable computing devices and the like in the depicted embodiment. Cards corresponding to respective sets of one or more screen layouts of various application workflows may be constructed from a variety of layout items of supported item types 1374 using simple "what-you-see-is-what-you-get" or WYSIWYG application authoring tools or interfaces (such as an application editor/viewer 1366) in various embodiments. Persistent versions of the cards may be stored in a markup language defined in a specification 1376 in at least some embodiments, and transmitted to various authoring devices for local caching as needed. Persistent representations or descriptors of the applications, which include references to expressions stored in the EMS, may be stored in a repository 1327 of the AAS in the depicted embodiment. Application metadata, such as the identities of application owners, application creation logs, application authoring permissions, application execution permissions, and the like, may be stored in a separate repository 1328 in some embodiments.

A variety of programmatic interfaces 1344 may be implemented by the AAS 1320, the SDMS 1330 and/or the EMS 1340 in the depicted embodiment, including for example respective sets of application programming interfaces (APIs), web-based consoles, graphical user interfaces, command-line tools and the like. Via such interfaces, an indication that a data sheet is to be used to store at least a portion of a data set accessed from an application being developed may be obtained in various embodiments at one or more of the services. A persistent representation of a cell-based expression (e.g., comprising a reference to a row identifier stored in a row link record of the kind discussed above, and/or a reference to a DMV of the kind discussed above) indicated at least in part by input obtained via an application authoring interface may be stored in the expressions definition repository 1356. The persistent representation may comprise a unique identifier assigned to the cell-based expression, and the expression itself may refer to one or more cells of one or more sheets stored in the SDMS, to features such as row links, DMVs and the like, and/or to mathematical/statistical functions (such as SUM, AVERAGE and other aggregation functions) supported for cell-based data at the SDMS.

A version of the application may be deployed to one or more execution platforms (such as platforms 1361A or 1361B). In the deployed version, at least one screen layout may be configured to display a value based at least in part on evaluating the expression. The version of the application may use the unique identifier to refer to the expression in at least some embodiments, and may not indicate the coordinates of the data sheet cells that are referenced in the expression. If/when the cells are modified, e.g., by a write operation directed to the data sheet in which the cells are included, the contents of the cells may be updated/modified without re-evaluating the expression itself in some embodiments; this approach may be referred to as deferred evaluation of the expression. Deferring evaluation of expressions until the evaluations are needed for a running instance of an application may save considerable processing resources in various embodiments, especially in scenarios where the underlying data sets of applications are changed frequently. Note that in some embodiments, if an expression's formula references a row identifier or a DMV, and the underlying data sheet contents are changed, the application may be notified regarding the changes. If and when the application issues a refresh request in response to the notification, the expression may be re-evaluated. In other embodiments, the expressions may be automatically re-evaluated when the underlying data set is changed.

When an application end user issues a request to run an instance of a deployed app (e.g., 1365A or 1365B) at an execution platform 1361, the layouts corresponding to one or more cards of the application may be displayed, e.g., in the order indicated in the application descriptor stored in repository 1327. In response to obtaining an end-user's request to view a layout that requires evaluation of a previously-stored expression in a running instance of the application, the expression may be re-evaluated (if needed) using the modified contents of cell(s) by an expression evaluation manager 1359, and a result of the re-evaluation may be used to populate the layout.

In some embodiments, a different approach may be taken with respect to organizing the operations associated with applications that use expressions to refer to contents of data sheets than that shown in FIG. 13. For example, in one embodiment, the described functionality of the application authoring and deployment service 1320 may be combined with the described functionality of the expressions management service 1340 into a single network-accessible service, the AAS and the SDMS may be combined into a single service, or all three services (the AAS, the SDMS and the EMS) may be implemented as a single service. Individual ones of the components of various ones of the services shown in FIG. 13 may be implemented using one or more computing devices in various embodiments. In at least one embodiment, separate repositories may not be used for storing object contents and metadata at a given service—for example, sheet contents and sheet metadata may be stored at a single repository, expression definitions and expressions metadata may be stored at a single repository, and/or application descriptors and application metadata may be stored at a single repository.

Example Application Authoring Interface

Figure 14:
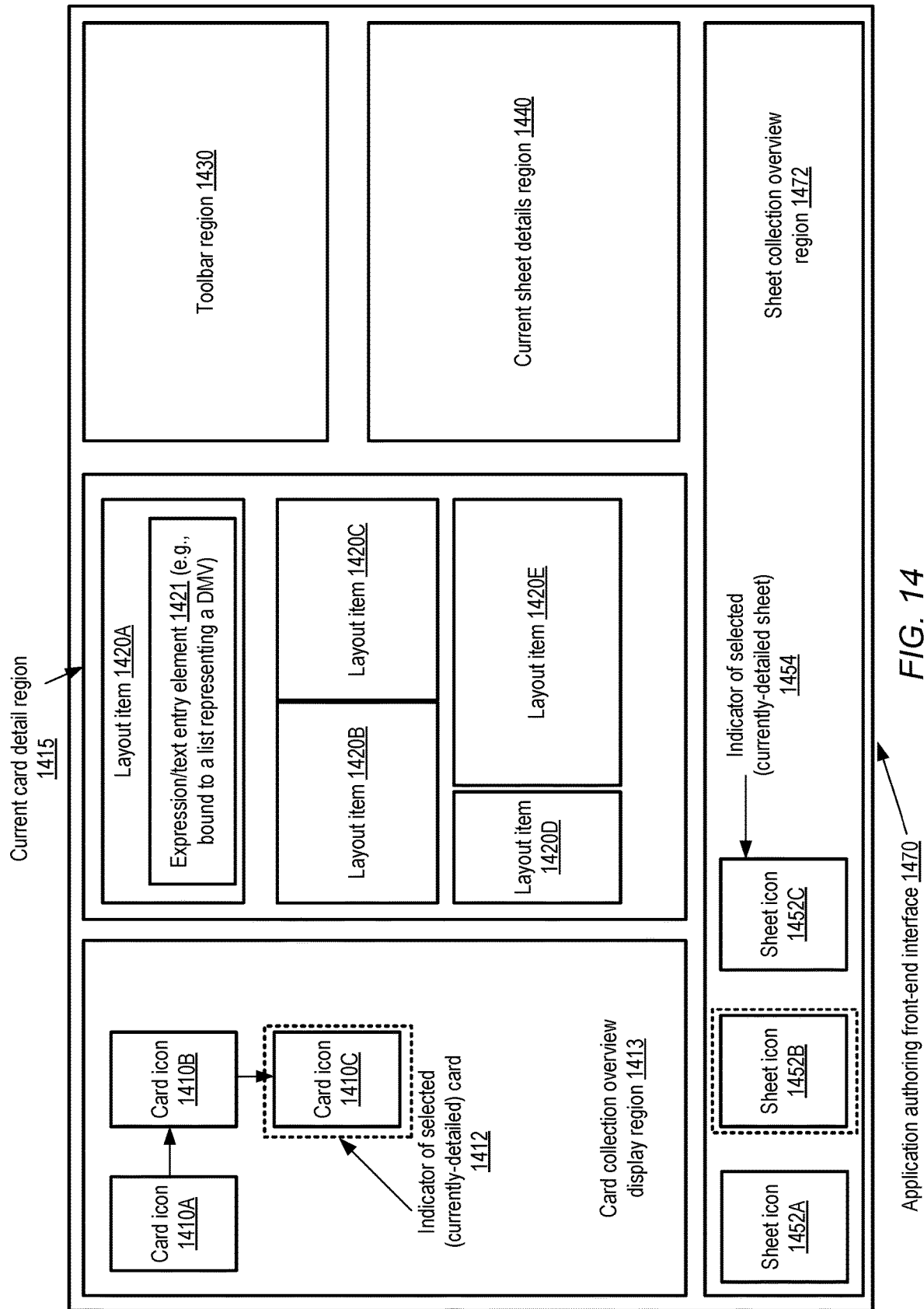
FIG. 14 illustrates an example interface of an application authoring tool that may be used to develop applications that utilize row link records and/or dynamically materialized views of a sheets based data management service, according to at least some embodiments.

FIG. 14 illustrates an example interface of an application authoring tool that may be used to develop applications that utilize row link records and/or dynamically materialized views of a sheets based data management service, according to at least some embodiments. The example interface 1470 may be presented to an application author during a session of interaction, e.g., from a desktop-based front-end authoring tool, with a mobile application authoring and deployment service in the depicted embodiment. The presented information may be distributed among at least five regions in the depicted embodiment: a card collection overview display region 1413, a current card detail region 1415, a sheet collection overview region 1470, a current sheet detail region 1440, and one or more toolbar regions 1430.

In region 1413, icons 14710 (e.g., 1410A, 1410B, and 1410C) representing at least a subset of the collection of cards that have been created for a mobile application which is being developed or tested may be shown in the depicted embodiment. Individual ones of the cards may represent respective layouts displayed on a mobile phone, tablet or laptop screen during the running of an instance of the application. Arrows linking the card icons may, for example, show the flow of interactions experienced by an end user— e.g., a click on a layout item of card 1410A by an application user may lead to a rendering of the layout of card 1410B, and a click on a layout item of card 1410B may lead to a rendering of the layout of card 1410C in the depicted example. At any given point in time, details of one or more of the card collections may be shown in expanded view region 1415, and the card(s) whose details are being displayed may be indicated using highlighting, a special color/font or some other indicator 1412 in the card collection overview region in some embodiments.

Within the current card details region 1415, various layout elements 1420, such as 1420A-1420E, may be arranged and re-arranged as desired by the application author during the course of an editing session. Some layout items, such as 1420A, may comprise expression or text entry elements 1421 into which the application author may enter a formula and/or other properties of an expression which is utilized at application runtime to populate the layout item and/or to perform an operation based on input entered into the layout item by an end user. The entered formula may include, for example, a Filter function of the kind discussed earlier to define and/or access the results of a DMV, a FindRow function of the kind discussed earlier to access a row of a logical table, and/or other functions related to row links or DMVs in various embodiments. In at least some embodiments, element 1421 may be bound to a dynamically changing list representing a DMV (e.g., enabling the application user to scroll up or down among the result rows of a DMV). As soon as the underlying data of such a DMV changes, the SDMS may notify client devices at which the application instance runs, indicating that the application data at the client device may have become out of date in various embodiments. A user may then submit a request to refresh the out-of-date data if desired. In some embodiments, application instances may be configured to auto-refresh their data, e.g., by submitting requests to the SDMS periodically or if a timeout has expired since the source data change notification was received at a client device. In some embodiments, card-based applications may have a configuration option that, if set, results in immediate refreshes of the application data when the underlying data at the SDMS changes.

A variety of layout item types may be supported in different embodiments, such as rich text elements or containers, repeaters/iterators, calendar entries, charts/images, forms which may be used for data/formula entry, maps, contact entries, video clips and the like. Icons 1452 (or tabs or other symbols), such as 1452A-1452C, representing individual data sheets whose contents may be referenced directly or via expressions in the application may be shown in sheets collection overview region 1472 of interface 1470 in the depicted embodiment. Details of a currently-viewed or currently-edited data sheet (for which a visual indicator 1454 such as a highlight, a contrasting color or font may be used) may be provided in region 1440 in the depicted embodiment. The toolbar region 1430 may comprise a collection of tools which can be used by the application author to arrange and/or format the contents of the other regions in the depicted embodiment—e.g., tools may be used to add/modify/remove cards, add/modify/remove sheets, add/modify/remove layout elements, and the like in various embodiments. By including one or more sheets (e.g., selected from a collection of sheets of a data management service) in region 1472 and/or 1440, an application author may indicate that the application being authored relies on a data set stored in the sheets in the depicted embodiment; and by entering a formula that refers to cells of the sheets using the expression entry element 1421, the application author may indicate the relationship between the application, the sheets based data set of the application and an independently stored expression. As such, the three types of services indicated in FIG. 13—the expressions management service, the sheets based data management service, and the application authoring service—may all be utilized jointly using interface 1470 in the depicted embodiment.

The positions, sizes, fonts, colors, and other properties of layout items 1420, including their associations with data sheets of the sheet collection and/or associated expressions, may be modified using simple point-and-click and/or drag-and-drop interface elements in various embodiments, considerably simplifying the development of the mobile application. In at least some embodiments, no source code may have to be entered by an application developer in order to create a fairly sophisticated application. In at least one embodiment, in addition to using straightforward graphical interactions, application authors may provide source code for some features of their applications if desired—for example, a tool of toolbar region 1430 may provide a source code editor, or may allow source code files to be uploaded by application authors. Expressions may be referenced in such source code, e.g., via their unique identifiers in various embodiments. In some embodiments, several different connectivity modes may be supported for application authoring—e.g., an online mode (in which updates entered via the application authoring interface are synchronously stored at a repository of the application authoring and deployment service), and an offline mode (in which updates entered via the interface are only saved to a local device that is not currently connected to the application authoring and deployment service, and synchronization with the service is deferred) may be supported. The current connectivity mode of the authoring tool may be displayed using a portion of interface 1470 in at least some embodiments. In various embodiments, the synchronization status of the local version of the application (e.g., whether the local version of the application's artifacts are synchronized with a master version stored in a repository of the application authoring/deployment service) may also be indicated.

Example Provider Network Environment

Figure 15:
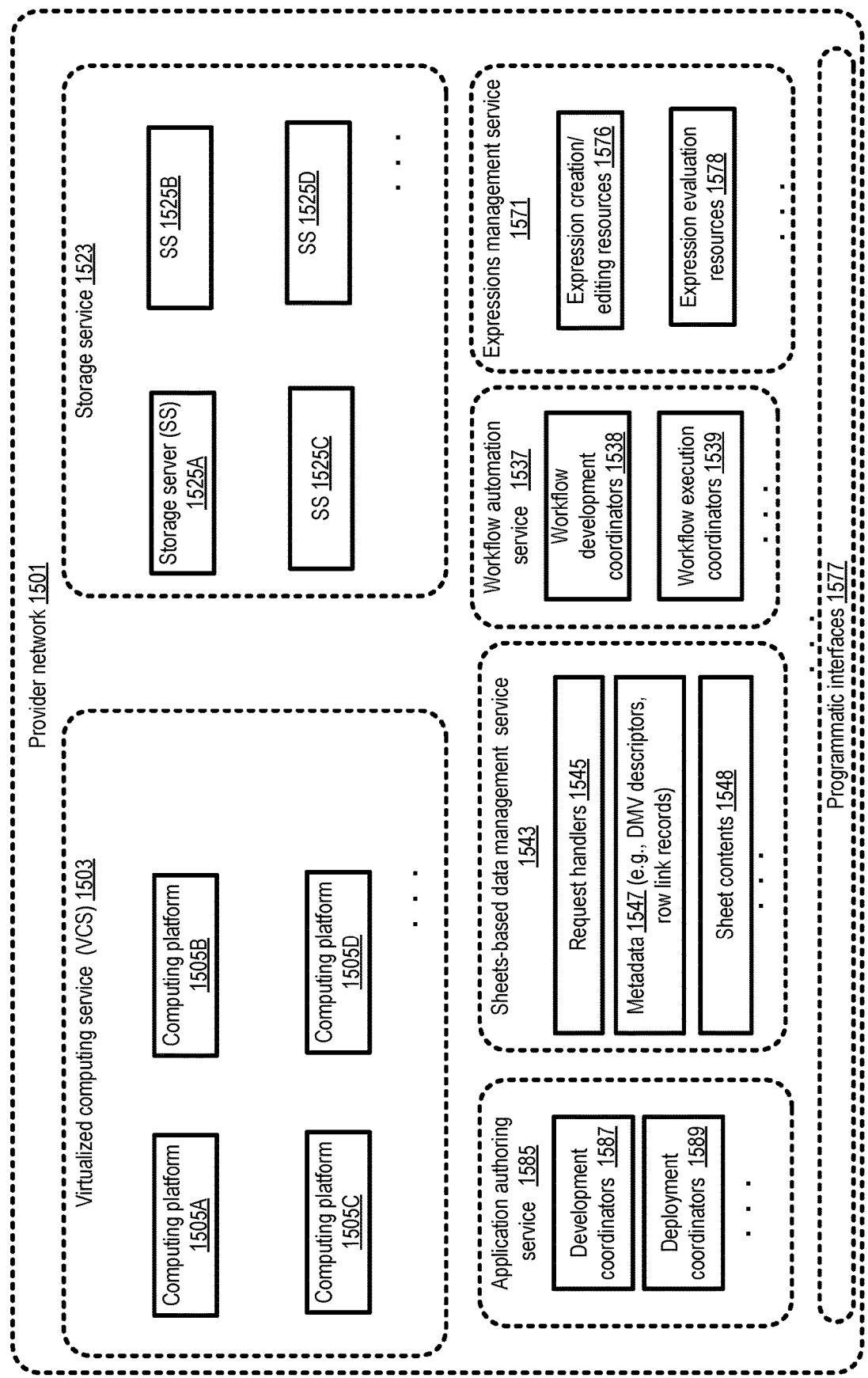
FIG. 15 illustrates an example provider network environment in which a sheets based data management service may be implemented, according to at least some embodiments.

In some embodiments a sheets based data management service may be implemented as part of a provider network. FIG. 15 illustrates an example provider network environment in which a sheets based data management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 1501 may comprise resources used to implement a plurality of services, including for example a virtualized computing service 1503, a storage service 1523, an application authoring service 1585, a sheets-based data management service 1543, a workflow automation service 1537, and an expressions management service 1571. Each of the services may include a respective set of computing devices and/or other resources in some embodiments. Components of a given service may utilize components of other services in the depicted embodiment—e.g., computing platforms 1505 (such as 1505A-1505D) of the virtualized computing service 1503 and/or storage servers 1525 (e.g., 1525A-1525D) of the storage service may be employed by various other services of provider network 1501. Individual ones of the services shown in FIG. 15 may implement a respective set of programmatic interfaces 1577 which can be used by external and/or internal clients (where the internal clients may comprise components of other services) in the depicted embodiment. In some embodiments, the sheets-based data management service 1543, the application authoring service 1585, and/or the expressions management service 1571 may be implemented as respective subsystems of a combined higher-level service.

The sheets-based data management service 1543 may comprise, among other components, one or more request handlers 1545, sheet contents 1548 and a collection of metadata 1547 (including DMV descriptors, row link records and the like) in the depicted embodiment. The request handlers 1545 may respond to client-submitted requests, e.g., from the application authoring service 1585, the expressions management service 1571 or from other clients, enabling the clients to create, populate, read, modify and delete various types of data sheets and data sheet contents, including sheets arranged in hierarchies and sheets comprising row links, DMVs and the like. The expressions management service 1571 may comprise a set of expression creation and editing resources 1576 as well as a set of expression evaluation resources 1578 in the depicted embodiment. Resources 1576 may be used to generate and store expression definition records and associated metadata, for example, while resources 1578 may be used to evaluate expressions(e.g., on demand, when required by running application instances as discussed earlier). As shown, the application authoring service 1585 may comprise one or more development coordinators 1587 and one or more deployment coordinators 1589 in the depicted embodiment. The development coordinators 1587 may be responsible for enabling the design and authoring of data sheets based applications using interfaces similar to the application authoring interfaces described above, while the deployment coordinators 1589 may be responsible for transmitting applications post-development to targeted mobile devices, loading and pre-fetching the appropriate subsets of data to the devices, and so on in various embodiments.

In some embodiments, a workflow automation service 1537 may also utilize the sheets based data management service 1543 and/or the expressions management service 1571. Workflows for automating various tasks of an organization may be generated and stored with the help of workflow development coordinators 1538, and decisions regarding the particular operations to be performed next may be made at various stages of individual workflows based on the results of evaluating sheets based expressions stored at the service 1571, or formulas of cells stored in sheets-based data management service 1543. Workflow execution coordinators 1549 may for example utilize expression evaluation resources 1578 to obtain such results in various embodiments. In some embodiments, a change log and a timer service may be used to enable workflows; e.g., workflows may depend on events from the change log or the timer service. Such changes may be at the data sheet cell level, or at the DMV level in various embodiments.

The storage service 1523 and/or the VCS 1503 may each provide high levels of availability, data durability, and failure resilience, enabling workloads associated with numerous concurrent sets of application authoring projects and workflow related projects that utilize data-sheet of the kind discussed earlier to be handled in various embodiments. In at least some embodiments, the applications developed at the service 1585 may be used to invoke processes or operations from other services—e.g., when an end user interacts with a particular layout element of an application, a service request may be transmitted to one or more other services of the provider network. In one embodiment, in response to determining that a particular cell of a sheet associated with an application has been updated from an application execution platform, a process may be instantiated, updated or terminated at a provider network service other than the application authoring and deployment service itself.

In at least one embodiment, at least some of the techniques discussed above for authoring and deploying applications based on using expressions and/or a web-of-sheets data model that supports DMVs and row link records may be accomplished using non-specialized computing platforms (e.g., virtual machines) of the virtualized computing service 1503. In some embodiments, the techniques for creating and manipulating data sheets, expressions and/or authoring applications may be implemented without acquiring resources of network-accessible services such as those shown in FIG. 15. For example, a standalone set of tools implemented at one or more computing devices which are not part of a network-accessible service may be used in some embodiments.

Methods for Generating and Using Row Links and Dynamically Materialized Views

Figure 16:
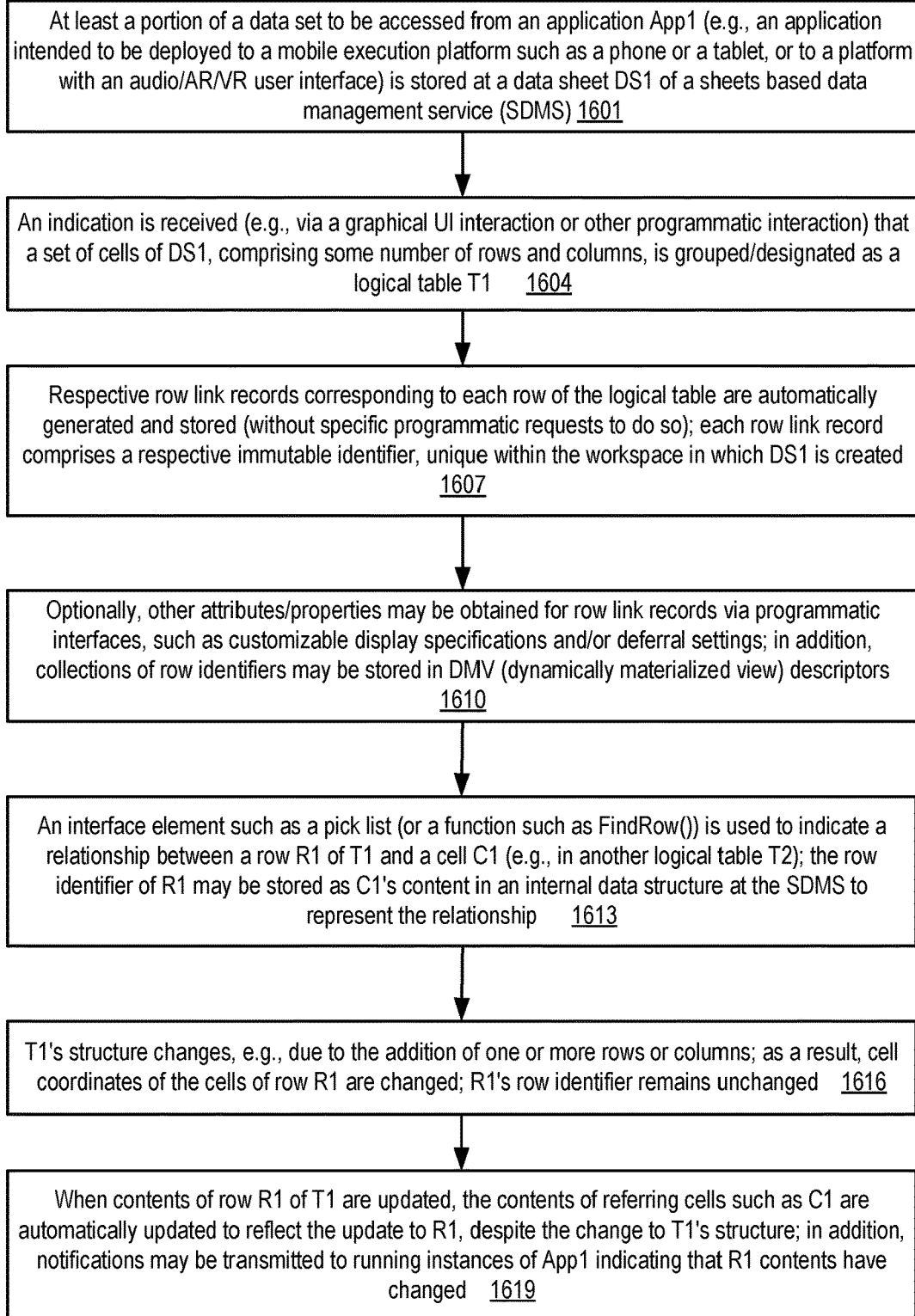
FIG. 16 is a flow diagram illustrating aspects of operations that may be performed to implement and utilize row link records at a sheets based data management service, according to at least some embodiments.

FIG. 16 is a flow diagram illustrating aspects of operations that may be performed to implement and utilize row link records at a sheets based data management service, according to at least some embodiments. As shown in element 1601, at least a portion of an initial data set of an application App1 may be stored at a data sheet DS1 managed at the sheets based data management service (SDMS) in the depicted embodiment. App1 may be designed for deployment to any of a variety of execution platforms, including for example mobile devices such as phones, tablet computing devices, laptops and the like, with the screens of such devices serving as one of the interfaces used to display output of App1 and/or receive input for App1. In some embodiments, App1 may be deployed to a platform whose user interfaces may include augmented reality or virtual reality interfaces, an audio interface similar to that of automated personal assistants, gesture-recognition interfaces or the like. The SDMS may receive an indication that App1's data set is to be stored at DS1 via a cards-based application authoring tool similar to that described above in the context of FIG. 14 in some embodiments.

As shown in element 1604 of FIG. 6, an indication may be received at the SDMS (e.g., via a graphical UI interaction or other programmatic interaction) that a set of cells of DS1, comprising some number of rows and columns, is to be grouped/designated as a logical table T1 in the depicted embodiment. For example, an SDMS client may select a number of rows and columns within DS1 using a mouse or similar interface, and then click on an interface element labeled "Create Table" in one embodiment. Alternatively, the client may submit a programmatic request indicating the coordinates of the cells that are to be included in the table (e.g., a request of the form "CreateTable[row5:row10][column17:column25]" may be submitted to indicate that a logical table with 6 rows and 9 columns is to be created.

In at least some embodiments, the SDMS may automatically generate and store respective row link records for each of the rows of T1, e.g., in response to the request to create T1 (element 1607). Each row link record may comprise a respective immutable identifier for the row in some embodiments. The row indicated by a row link record or identifier may be referred to as the source row of the row link record in some embodiments. The structure and format of the unique identifier may vary in different embodiments—e.g., a 128-bit integer, a 32-character string, or some such data element may be used. The identifier selected for a row may be independent of the contents of the row and the cell coordinates of the row in at least some embodiments—that is, it may not be possible to determine the location of the row by analyzing the identifier, and it may not be possible to determine the contents of the row by analyzing the identifier. A given row identifier may be unique, at least within the workspace to which DS1 belongs in some embodiments—that is, all the row identifiers generated for all the tables within the workspace may be different from each other. Once assigned to a given row of a given source table such as T1, a row identifier may remain unchanged, even if the source table structure is modified (e.g., if one or more new rows are added, or one or more new columns are added, the already-generated row identifiers may not be changed). In at least some embodiments, when a logical table such as T1 is created, some of its rows may be empty (i.e., the cells of the rows may contain no data); row identifiers may nevertheless be automatically generated for the empty rows. If/when a new row is added to T1, a new row link record with a newly-generated row identifier may be stored. In various embodiments, the row identifiers may serve as links or pointers to the corresponding table rows, analogous in some ways to HTTP (HyperText Transfer Protocol) links that can be used to access respective web pages or portions of web pages. In one embodiment, when requesting the creation of a logical table such as T1, an SDMS client may be given the option of deciding whether row link records are to be automatically generated and stored, or not. If, for example, the client decides that a given logical table is not going to be referenced from an application such as App1 or from any cells in the workspace, the client may decide that row link records need not be created and stored, thereby reducing the resource usage of the SDMS.

Optionally, other attributes/properties may be stored in row link records in some embodiments (element 1607). Such attributes may include, for example, a display specification for a source row, indicating which columns are to be displayed from referencing cells (cells that refer to the source row using the identifier stored in the row link record), and how the values in the selected columns are to be formatted. In some embodiments, a row of T1 may be referred to or referenced from another cell or application (e.g., for sorting or comparing rows) using a string representation of the row that was generated based on the display settings for the row. In some embodiments, deferral settings for the source row may be stored in a row link record. A deferral setting associated with a row link or identifier may be specified via a programmatic interface by an SDMS client may, for example be used to indicate that updates directed to the source row should not be propagated immediately to referencing cells. Instead, the deferral setting may indicate that a notification is to be directed to the referencing cell and/or one or more other destinations, in effect informing an SDMS client or application that the contents of the referencing cell are out-of-date or stale. In response to such a notification, in at least some embodiments a refresh request may be submitted for the referencing cell. The contents of the referencing cell or application may be updated in response to such a refresh request in some embodiments. In various embodiments, row collections of row identifiers generated for respective rows of T1 that meet a specified criterion may be stored in DMV (dynamically materialized view) descriptors as indicated earlier.

A number of interfaces or interface elements may be implemented at the SDMS to enable clients to utilize row identifiers to refer to the corresponding source rows, e.g., to indicate relationships between different logical tables. For example, in some embodiments, a pick list component of a graphical user interface (similar to the pick list shown in FIG. 6) may be used to populate cells in a second logical table T2 (or anywhere in the data sheets of the workspace in which DS1 was created) with row identifiers of T1. The row identifier of a particular row R1 in T1 may, for example, be included in an internal SDMS record stored to indicate contents of the referencing cell C1 in T2 in some implementations. When selecting a pick list as the mechanism to be used to populate a cell, an SDMS client may be able to indicate the name of a source table of the workspace (or an identifier of a source DMV that was created earlier in the workspace) in at least some embodiments. The options presented via the picklist may comprise all the rows of the specified source table or DMV, with each row being displayed within the picklist based on the display settings of the corresponding row link record. Other ways to obtain a row identifier to indicate a relationship between a referencing cell and a source row may include functions such as Find-Row( ) in some embodiments, to which a query indicating a criterion for selecting the source row may be provided as input to the function as discussed earlier. FindRow( ) or similar functions may be used to populate not just referencing cells within data sheets, but also to populate components of App1, which result in the display of source row column values via App1's user interface. As such, data sheet cells and application components may both represent examples of target data elements whose contents can be determined using row identifiers stored at the SDMS and identified via FindRow( ) or similar interfaces in some embodiments. In one example use of a picklist with respect to a DMV and a card-based application, consider a scenario in which users are associated with projects, the user-project associations are indicated by rows in a User_Projects logical table with [User] and [Project] columns, each project comprises several tasks that are indicated by rows of a Tasks logical table with columns [Task] and [Project]. A user is looking for unassigned tasks to work on, and information about such assignments is stored in a table User_WorkItems with columns [User], [Task], [Status] and [Free Tasks]. Assume also that from a card of an application, a function can be executed to obtain the row identifier of the user (denoted by [User]). A pick list may be created on a DMV [Free Tasks] using syntax similar to [Free Tasks]=Filter(Tasks,"Tasks [Project]=%", FindRow (User_Projects[User]=[User])). The pick list may allow a user of the application to only pick from among those Tasks that are associated with the user's project.

The structure of the source logical table T1 may change (element 1613), e.g., due to the addition of one or more rows or columns, in the depicted embodiment. As a result, cell coordinates of the cells of a row R1 of T1 may change, but R1's row identifier may remain unchanged. If/when the contents of R1 are modified (e.g., based on user input, or based on updates propagated from some other table or DMV) (element 1619), the contents of referring cells such as C1 may be automatically updated in at least some embodiments to reflect the update to R1, despite the change to T1's structure. In addition, in some embodiments, notifications may be transmitted to running instances of App1 indicating that R1 contents have changed; such notifications may result in automated changes to the output presented by App1 in some cases. For example, in one embodiment the SDMS and/or the application authoring service being used may maintain metadata which indicates all the client devices (at which the application instances may be running) to which notifications are to be sent, the specific mechanisms/protocols to be used to send the notifications, actions to be taken if a given client device happens to be offline or unreachable at the time that the changes to the underlying data are detected, and so on, and such metadata may be employed to manage the notifications.

Figure 17:
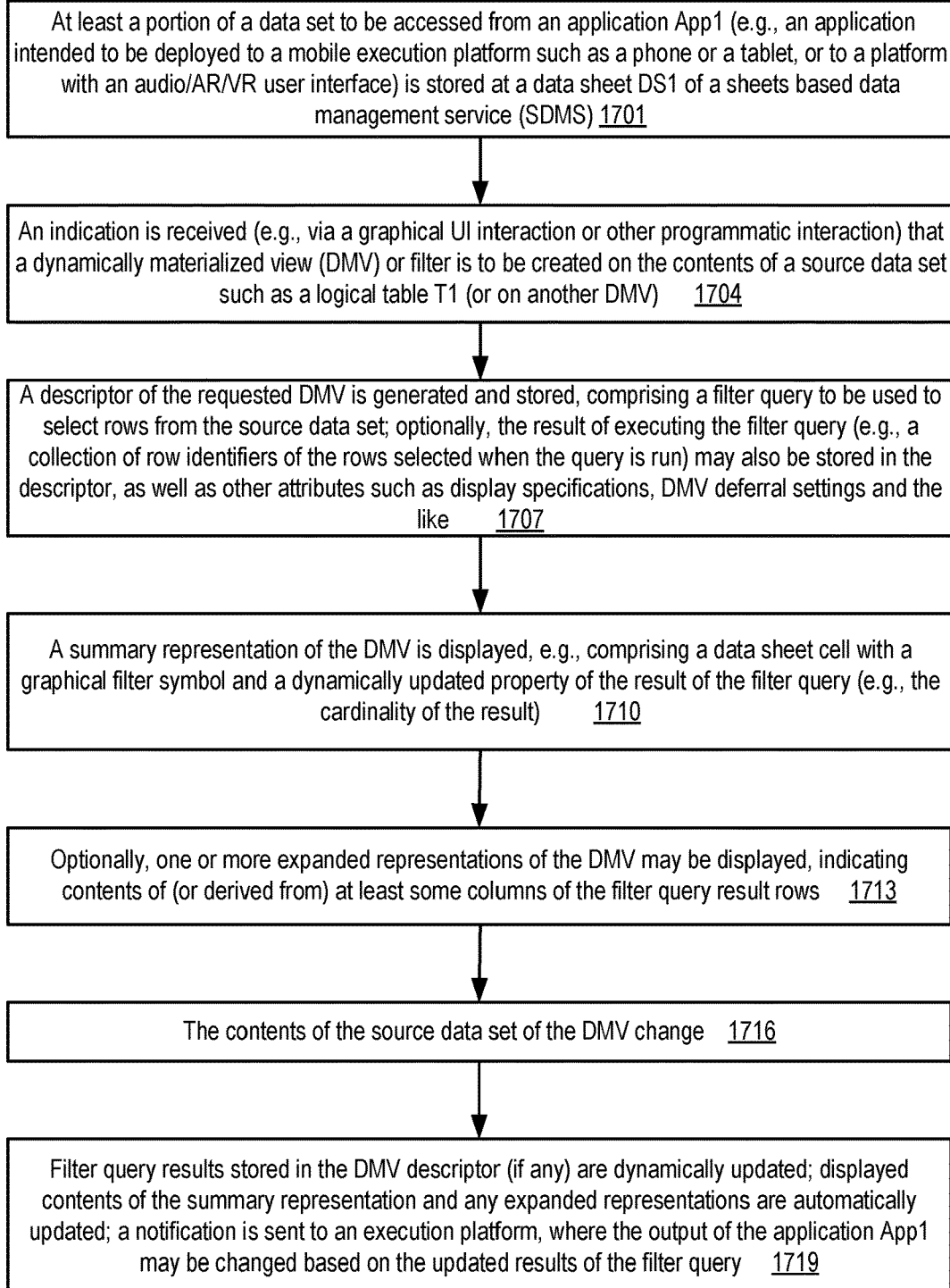
FIG. 17 is a flow diagram illustrating aspects of operations that may be performed to implement and utilize dynamically materialized views at a sheets based data management service, according to at least some embodiments.

FIG. 17 is a flow diagram illustrating aspects of operations that may be performed to implement and utilize dynamically materialized views at a sheets based data management service, according to at least some embodiments. As shown in element 1701, at least a portion of an initial data set of an application App1 may be stored at a data sheet DS1 managed at the sheets based data management service (SDMS) in the depicted embodiment. App1 may be designed for deployment to any of a variety of execution platforms, including for example mobile devices such as phones, tablet computing devices, laptops and the like, with the screens of such devices serving as one of the interfaces used to display output of App1 and/or receive input for App1. In some embodiments, App1 may be deployed to a platform whose user interfaces may include augmented reality or virtual reality interfaces, an audio interface similar to that of automated personal assistants, gesture-recognition interfaces or the like. The SDMS may receive an indication that App1's data set is to be stored at DS1 via a cards-based application authoring tool similar to that described above in the context of FIG. 14 in some embodiments.

An indication may be received at the SDMS (e.g., via a graphical UI interaction or other programmatic interaction) that a dynamically materialized view (DMV) or filter is to be created on the contents of a source data set such as a logical table T1 defined within DS1 or some other sheet of the workspace (element 1704). For example, in some embodiments the use of any of several variants of a "Filter( )" function within a formula for a cell may indicate that a DMV is to be created. Note that in at least one embodiment, wherever the SDMS permits a logical table to be used as an input to an operation or function (such as a Filter( ) function), a DMV may alternatively be used as the input; that is, logical tables and DMVs may be treated as equivalent data types in such embodiments. In some embodiments, a version of the Filter( ) function may be used to compare the contents of two data sets, e.g., to find rows that are in both source data sets, or to find rows that are in one source data set but not the other. For example, a filter query may indicate (a) a presence criterion associated with a first source data set (a logical table or DMV), and (b) an absence criterion associated with a second source data set (another logical table or DMV). A result of executing such a filter query (stored in a DMV descriptor corresponding to the query) may comprise a row identifier of at least one row of cells that is (a) present in the first source data set and (b) absent from the second source data set. In various embodiments, DMVs may be pipelined or chained with other DMVs—e.g., using a filter creation syntax similar to "Filter(Filter(Filter(<source S1>, <query Q1>),<query Q2>),<query Q3>)", a 3-level DMV pipeline may be created. DMV creation requests may define queries that include aggregation functions (such as SUM, AVERAGE, etc.), in some embodiments. Similarly, the results of DMVs may also be aggregated within cell formulas, e.g., using syntax similar to "=SUM[DMV1] [Column2]", the sum of the "Column2" values of all the rows in DMV1 may be obtained.

A descriptor or metadata record of the requested DMV may be generated and stored in various embodiments (element 1707). The descriptor may, for example, comprise a filter query (which may be specified programmatically by the SDMS client on whose behalf the DMV is being created) to be used to select rows from the source data set. The filter query may comprise one or more predicates or clauses expressed in terms of the column names or column identifiers of the source data set. Optionally, the result of executing the filter query (e.g., a collection of row identifiers of the rows selected when the query is run) may also be stored in the descriptor, as well as other attributes such as display specifications, DMV deferral settings, the coordinates of a cell in which a summary representation of the DMV is to be displayed, a user-defined name for the DMV, and the like. A display specification may, for example, indicate which property of the query result is to be included in a summary representation of the DMV, which symbol (such as the funnel-like symbol shown in FIG. 3) is to be used to indicate that the DMV is summarized within a cell, and so on. A deferral setting may be used by an SDMS client to indicate that, instead of immediately updating an expanded representation or summary representation when the source data set changes, such update propagation is to be deferred until a refresh request is received for the relevant DMV. Instead of an immediate propagation of the relevant updates, a notification indicating that the DMV query results have changed may be transmitted to one or more destinations (e.g., target cells in which summary representations of the DMV are displayed, sheet regions in which expanded representations of the DMV are displayed, applications whose output is based on the DMV, and so on).

A summary representation of the DMV may be displayed in one or more cells of a data sheet (e.g., DS1, or another data sheet in DS1's workspace) in various embodiments (element 1710). Such a summary representation may comprise, for example, a graphical filter symbol and a dynamically updated property of the result of the filter query (e.g., the cardinality of the result). Any of a variety of properties may be indicated in the summary representation in different embodiments. For example, instead of displaying just the cardinality of the result, an indication of the direction in which the cardinality is changing may be shown in one embodiment. If the cardinality of the DMV filter query result set increases from 4 to 8 as a result of an update to the source data set, for example, the display in the summary representation may indicate the tokens: "4→8". In one embodiment, a cell of DS1 may by default be assigned to show the summary representation of a DMV as part of the process of creating the DMV via a graphical user interface—for example, as soon as an SDMS client inserts the "Filter( )" function defining a DMV within the formula of a cell C1, that cell C1 may be assigned to display the summary representation. DMVs may be referenced using any of a number of approaches in various embodiments, e.g., from within applications such as App1 or from other cells of one or more data sheets. For example, if a user-defined name has been designated for a DMV, that user-defined name may be used to refer to the DMV in a target cell. Alternatively, the coordinates of a cell comprising a summary of the DMV may be used to reference the DMV, or a string generated in accordance with a display specification may be used.

Optionally, in some embodiments, one or more expanded representations of the DMV may be displayed, indicating contents of (or derived from) at least some columns of the filter query result rows (element 1713). Such expanded representations may be displayed in regions of one or more data sheets selected by the client on whose behalf the DMV is created in some embodiments, and/or within layouts of card-based application such as may be authored using interfaces of the kind shown in FIG. 14.

Contents of the source data set (e.g., the logical table, or some other DMV from whose results the current DMV rows are selected) of the DMV may be modified in the depicted embodiment (element 1716), e.g., based on input received from SDMS clients and/or updates propagated from some other data sheets or applications. In various embodiment, any combination of several different types of actions may be initiated at the SDMS in response to the update of the source data set. For example, as shown in element 1719, filter query results stored in the DMV descriptor (if any) may be dynamically updated; displayed contents of the summary representation and any expanded representations may be automatically updated; and/or a notification may be sent to an execution platform, where the output of the application App1 may be changed based on the updated results of the filter query. In scenarios in which the expanded representation is sorted on the value of some column, the modified version of the expanded representation may be automatically re-sorted, resulting in the re-arrangement of various rows of the expanded representation.

It is noted that in various embodiments, some of the operations shown in FIG. FIG. 16 or FIG. 17 may be implemented in a different order than that shown in the figure, or may be performed in parallel rather than sequentially. Additionally, some of the operations shown in FIG. 16 or FIG. 17 may not be required in one or more implementations.

Use Cases

The techniques described above, of automatically generating and storing immutable row identifiers for logical tables defined within data sheets, and of creating dynamically materialized views whose results comprise such row identifiers, may be useful in a variety of scenarios. Numerous small business owners who are not experts in software development or traditional database techniques may for example be able to generate highly robust customized applications using such expressions, as updates to expressions resulting from changes to the underlying data sheets may be propagated automatically. The use of the familiar spreadsheet-like data sheets interfaces may considerably simplify the task of application authoring, while the richness of the data relationships that can be modeled using row links/identifiers and dynamically materialized views may equal or exceed those that can be modeled using traditional databases. A large population of individuals and organizations may be able to develop and deploy mobile and other applications easily and securely, without having to write source code.

Illustrative Computer System

Figure 18:
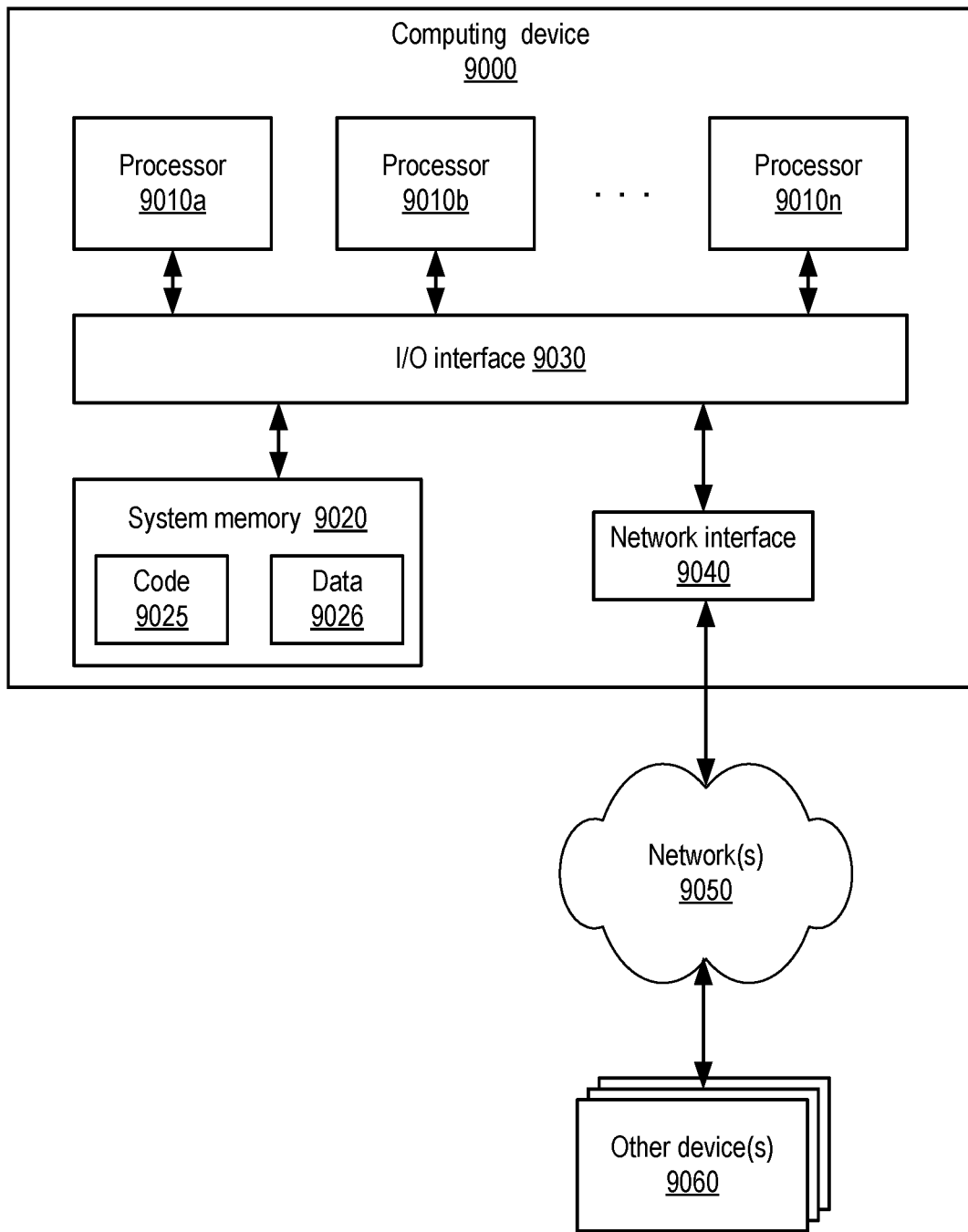
FIG. 18 is a block diagram illustrating an example computing device that may be used in at least some embodiments.

In at least some embodiments, a server that implements a portion or all of one or more of the technologies described herein, including the techniques for storing, evaluating and managing row links, dynamically materialized views and data sheets based expressions, authoring and deploying applications that use such expressions, creating and modifying cards, data sheets and the like may include a general-purpose computer system that includes or is configured to access one or more computer-accessible media. FIG. 18 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 17, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 17 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 18 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
   storing data of an application at least in part within a first logical table of a data sheet, wherein the first logical table comprises a plurality of cells arranged in one or more rows and one or more columns;
   obtaining, via one or more programmatic interfaces, a first filter definition to be used to populate at least a particular cell of the first logical table, wherein the first filter definition comprises (a) an indication of a second logical table and (b) a self-reference function which refers to a row within which the self-reference function is invoked; and
   determining at least a first value to be displayed in the particular cell in accordance with the first filter definition, wherein the first value is obtained from the second logical table based on a second value, and wherein the second value is obtained, in accordance with the self-reference function, from a particular row to which the particular cell belongs.

2. The computer-implemented method as recited in claim 1, further comprising:

causing a symbol representing a filter operation to be displayed in the particular cell.

3. The computer-implemented method as recited in claim 1, further comprising:
dynamically updating a value displayed in the particular cell, in accordance with the first filter definition, in response to detecting an update to the second logical table.

4. The computer-implemented method as recited in claim 1, wherein the particular cell belongs to a particular column of the first logical table, the computer-implemented method further comprising:
determining, using the first filter definition, respective values to be displayed in one or more other cells of the particular column.

5. The computer-implemented method as recited in claim 1, wherein the one or more programmatic interfaces are implemented by a service of a cloud computing environment.

6. The computer-implemented method as recited in claim 1, further comprising:
obtaining, via the one or more programmatic interfaces, a second filter definition to be used to populate at least another cell of the first logical table, wherein the second filter definition is expressed using the first filter definition; and
populating the other cell of the first logical table using at least the first filter definition and the second filter definition.

7. The computer-implemented method as recited in claim 1, further comprising:
in response to a programmatic request to create the first logical table, generating and storing respective row identifiers of individual rows of the first logical table; and
providing, in response to a query submitted from a particular row of the first logical table, wherein the query comprises the self-reference function, a row identifier generated for the particular row.

8. A system, comprising:
one or more computing devices;
wherein the one or more computing devices include instructions that upon execution on or across the one or more computing devices cause the one or more computing devices to:
store data of an application at least in part within a first logical table of a data sheet, wherein the first logical table comprises a plurality of cells arranged in one or more rows and one or more columns;
obtain, via one or more programmatic interfaces, a first filter definition to be used to populate at least a particular cell of the first logical table, wherein the first filter definition comprises (a) an indication of a second logical table and (b) a self-reference function which refers to a row within which the self-reference function is invoked; and
determine at least a first value to be displayed in the particular cell in accordance with the first filter definition, wherein the first value is obtained from the second logical table based on a second value, and wherein the second value is obtained, in accordance with the self-reference function, from a particular row to which the particular cell belongs.

9. The system as recited in claim 8, wherein the one or more computing devices include further instructions that upon execution on or across the one or more computing devices cause the one or more computing devices to:
cause a symbol representing a filter operation to be displayed in the particular cell.

10. The system as recited in claim 8, wherein the one or more computing devices include further instructions that upon execution on or across the one or more computing devices cause the one or more computing devices to:
dynamically update a value displayed in the particular cell, in accordance with the first filter definition, in response to detecting an update to the second logical table.

11. The system as recited in claim 8, wherein the particular cell belongs to a particular column of the first logical table, wherein the one or more computing devices include further instructions that upon execution on or across the one or more computing devices cause the one or more computing devices to:
determine, using the first filter definition, respective values to be displayed in one or more other cells of the particular column.

12. The system as recited in claim 8, wherein the one or more programmatic interfaces are implemented by a service of a cloud computing environment.

13. The system as recited in claim 8, wherein the one or more computing devices include further instructions that upon execution on or across the one or more computing devices cause the one or more computing devices to:
obtain, via the one or more programmatic interfaces, a second filter definition to be used to populate at least another cell of the first logical table, wherein the second filter definition is expressed using the first filter definition; and
populate the other cell of the first logical table using at least the first filter definition and the second filter definition.

14. The system as recited in claim 8, wherein the one or more computing devices include further instructions that upon execution on or across the one or more computing devices cause the one or more computing devices to:
in response to a programmatic request to create the first logical table, generate and store respective row identifiers of individual rows of the first logical table; and
provide, in response to a query submitted from a particular row of the first logical table, wherein the query comprises the self-reference function, a row identifier generated for the particular row.

15. One or more non-transitory computer-accessible storage media storing program instructions that when executed on or across one or more processors cause the one or more processors to:
store data of an application at least in part within a first logical table of a data sheet, wherein the first logical table comprises a plurality of cells arranged in one or more rows and one or more columns;
obtain, via one or more programmatic interfaces, a first filter definition to be used to populate at least a particular cell of the first logical table, wherein the first filter definition comprises (a) an indication of a second logical table and (b) a self-reference function which refers to a row within which the self-reference function is invoked; and
determine at least a first value to be displayed in the particular cell in accordance with the first filter definition, wherein the first value is obtained from the second logical table based on a second value, and wherein the second value is obtained, in accordance with the self-reference function, from a particular row to which the particular cell belongs.

16. The one or more non-transitory computer-accessible storage media as recited in claim 15, storing further program instructions that when executed on or across the one or more processors cause the one or more processors to:
   cause a symbol representing a filter operation to be displayed in the particular cell.

17. The one or more non-transitory computer-accessible storage media as recited in claim 15, storing further program instructions that when executed on or across the one or more processors cause the one or more processors to:
   dynamically update a value displayed in the particular cell, in accordance with the first filter definition, in response to detecting an update to the second logical table.

18. The one or more non-transitory computer-accessible storage media as recited in claim 15, wherein the particular cell belongs to a particular column of the first logical table, the one or more non-transitory computer-accessible storage media storing further program instructions that when executed on or across the one or more processors cause the one or more processors to:
   determine, using the first filter definition, respective values to be displayed in one or more other cells of the particular column.

19. The one or more non-transitory computer-accessible storage media as recited in claim 15, wherein the one or more programmatic interfaces are implemented by a service of a cloud computing environment.

20. The one or more non-transitory computer-accessible storage media as recited in claim 15, storing further program instructions that when executed on or across the one or more processors cause the one or more processors to:
   obtain, via the one or more programmatic interfaces, a second filter definition to be used to populate at least another cell of the first logical table, wherein the second filter definition is expressed using the first filter definition; and
   populate the other cell of the first logical table using at least the first filter definition and the second filter definition.

* * * * *